United States Patent
Chi et al.

(10) Patent No.: US 10,863,216 B2
(45) Date of Patent: Dec. 8, 2020

(54) TERMINAL USING INTELLIGENT ANALYSIS FOR DECREASING PLAYBACK TIME OF VIDEO

(71) Applicant: LG ELECTRONICS INC., Seoul (KR)

(72) Inventors: Jumin Chi, Seoul (KR); Songyi Baek, Seoul (KR); Jihye Ham, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 15/792,246

(22) Filed: Oct. 24, 2017

(65) Prior Publication Data

US 2018/0338167 A1    Nov. 22, 2018

(30) Foreign Application Priority Data

May 17, 2017 (KR) ........................ 10-2017-0060823

(51) Int. Cl.
*H04N 21/238* (2011.01)
*H04N 21/2387* (2011.01)
(Continued)

(52) U.S. Cl.
CPC ......... *H04N 21/2387* (2013.01); *G06N 20/00* (2019.01); *G11B 27/005* (2013.01); *G11B 27/031* (2013.01); *H04N 21/234381* (2013.01); *H04N 21/40* (2013.01); *H04N 21/47217* (2013.01)

(58) Field of Classification Search
CPC ............................ H04N 21/2387; G06F 15/18
See application file for complete search history.

(56) References Cited

U.S. PATENT DOCUMENTS 7,313,808 B1 * 12/2007 Gupta .................. G11B 27/034
348/E7.061
2006/0080591 A1    4/2006 Huang et al.
(Continued)

FOREIGN PATENT DOCUMENTS

WO        2017079241        5/2017

OTHER PUBLICATIONS

European Patent Office Application Serial No. 17001837.8, Search Report dated May 28, 2018, 13 pages.
(Continued)

*Primary Examiner* — Girumsew Wendmagegn
(74) *Attorney, Agent, or Firm* — Lee, Hong, Degerman, Kang & Waimey PC

(57) ABSTRACT

Terminal using intelligent analysis for decreasing playback time of video. The terminal includes a controller configured to store, in the memory, use pattern information of a user and select an object to be used as an editing criterion of a first video, based on the stored use pattern information. The controller also identifies in the first video one or more first playback sections which include the object and one or more second playback sections which do not include the object. In addition, the controller is configured to delete from the first video the one or more second playback sections to generate a second video, decrease a playback time of the second video to a predetermined playback time, and cause the display to display the second video having the predetermined playback time according to a video playback request.

10 Claims, 35 Drawing Sheets

(51) Int. Cl.
    *G06N 20/00*       (2019.01)
    *G11B 27/031*     (2006.01)
    *G11B 27/00*      (2006.01)
    *H04N 21/40*      (2011.01)
    *H04N 21/2343*    (2011.01)
    *H04N 21/472*     (2011.01)

(56) References Cited

U.S. PATENT DOCUMENTS

| | | | |
|---|---|---|---|
| 2010/0060722 A1* | 3/2010 | Bell | G06F 3/017 |
| | | | 348/51 |
| 2011/0292245 A1 | 12/2011 | Deever | |
| 2012/0084655 A1 | 4/2012 | Gallagher et al. | |
| 2013/0091431 A1* | 4/2013 | Master | H04N 21/44008 |
| | | | 715/719 |
| 2013/0254816 A1 | 9/2013 | Kennedy et al. | |
| 2013/0343729 A1* | 12/2013 | Rav-Acha | G11B 27/28 |
| | | | 386/285 |
| 2017/0032178 A1* | 2/2017 | Henry | G06T 11/60 |
| 2017/0064244 A1* | 3/2017 | Abou Mahmoud | G11B 27/005 |
| 2017/0110151 A1 | 4/2017 | Matias et al. | |
| 2018/0132006 A1 | 5/2018 | Galant et al. | |
| 2018/0249213 A1* | 8/2018 | Bostick | H04N 21/4542 |

OTHER PUBLICATIONS

European Patent Office Application Serial No. 17001837.8, Search Report dated Sep. 25, 2018, 14 pages.

* cited by examiner

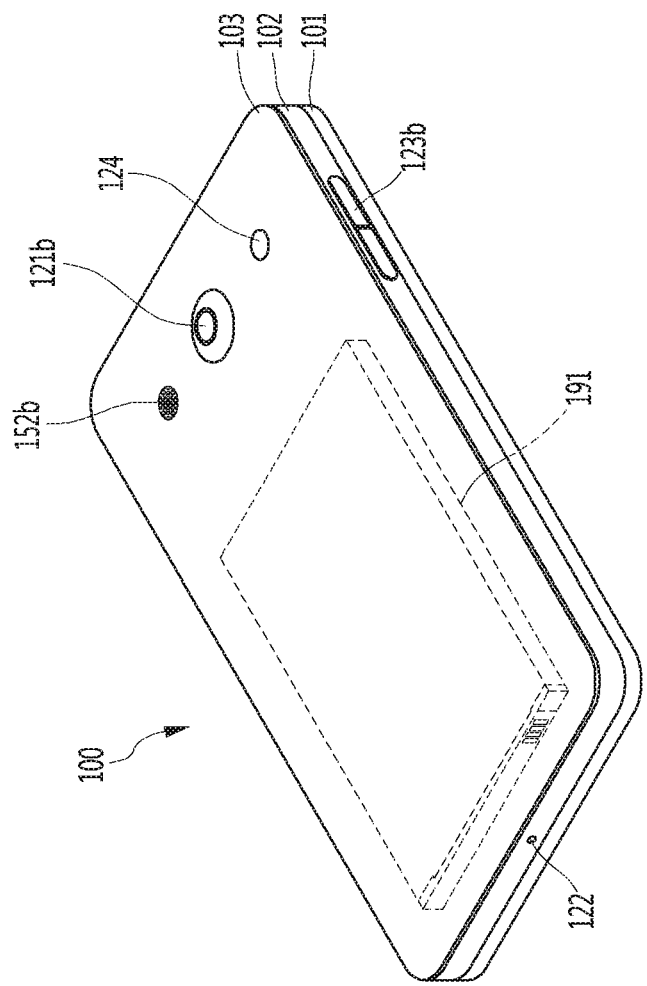

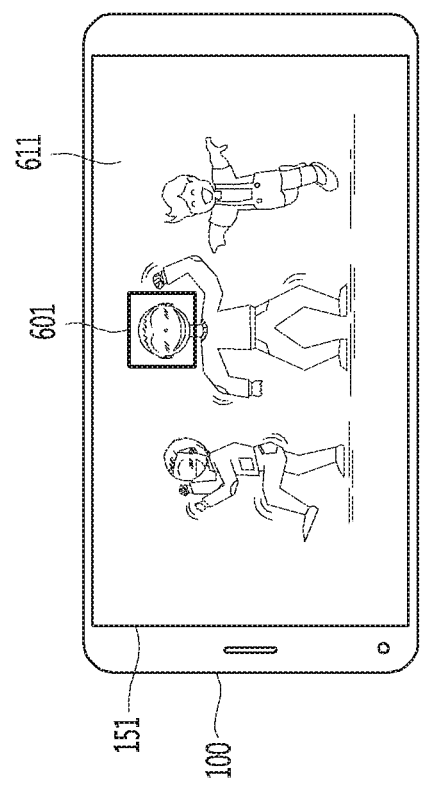
FIG. 6A(1)

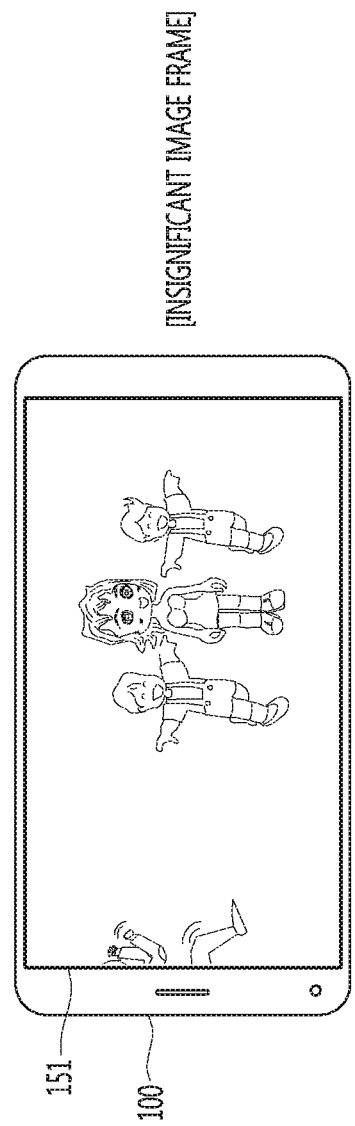
FIG. 6A(2)

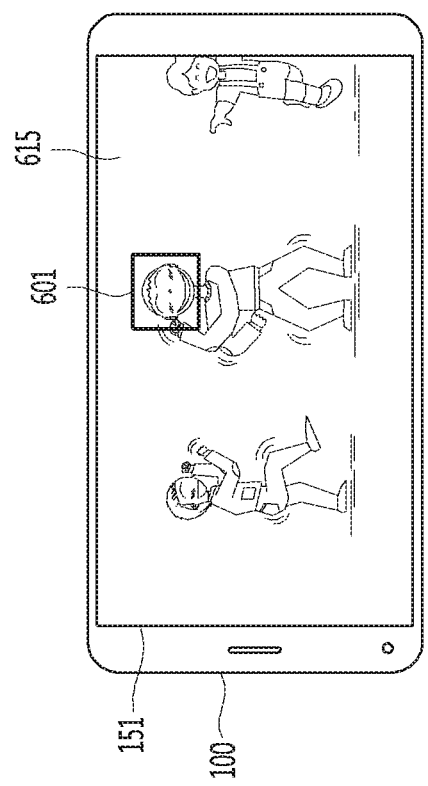

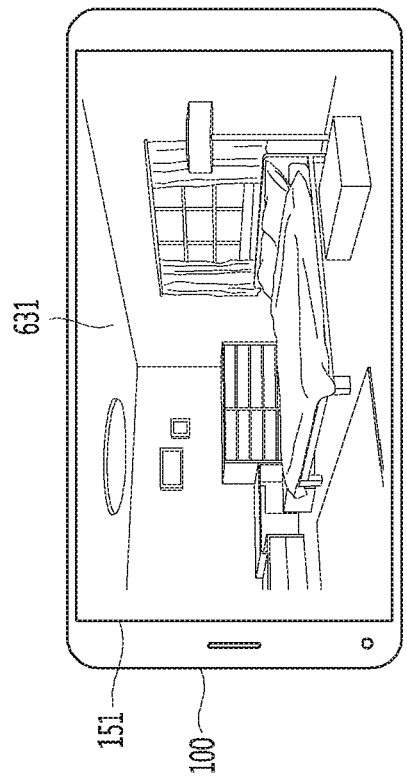

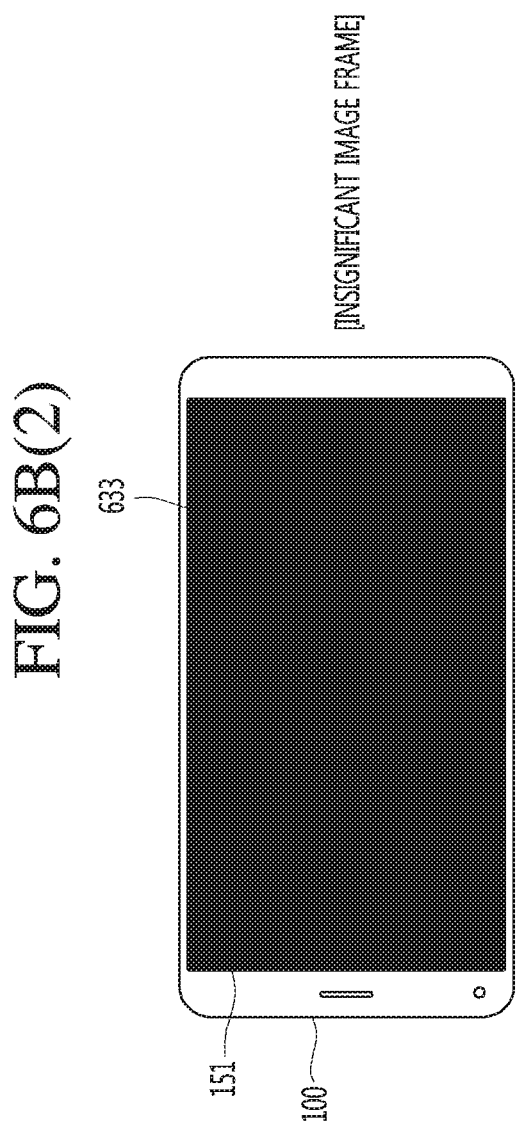
FIG. 6B(2)

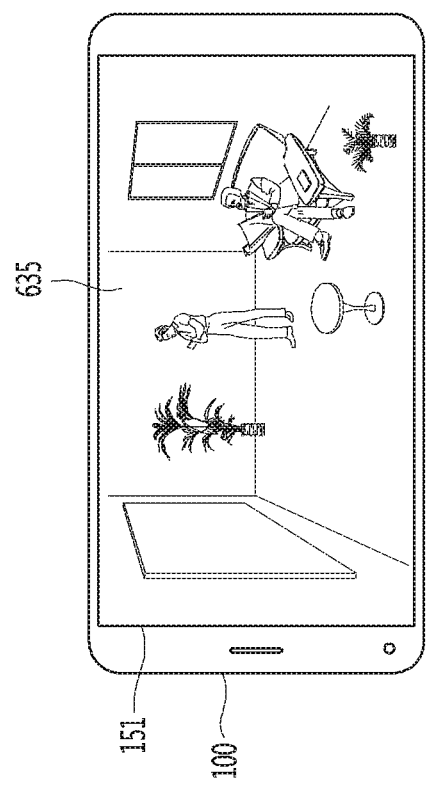

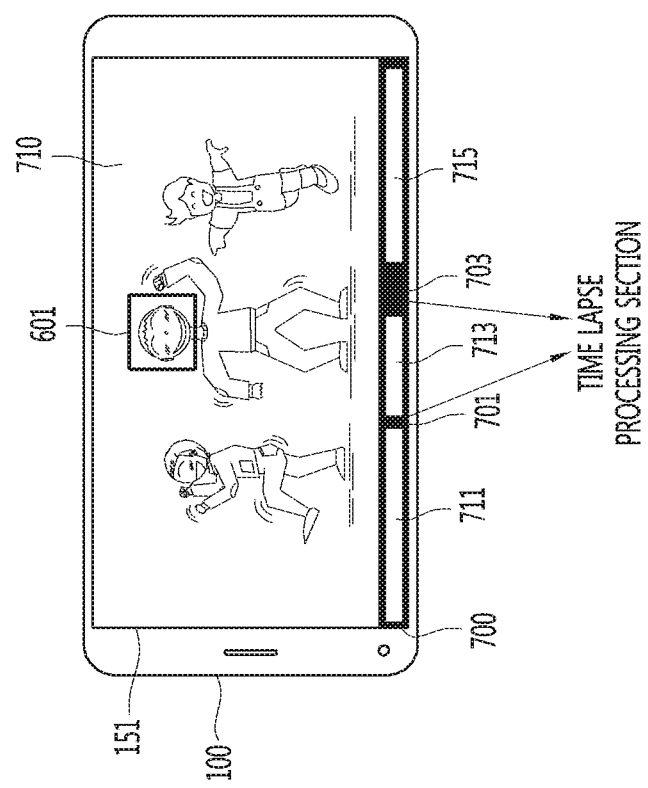

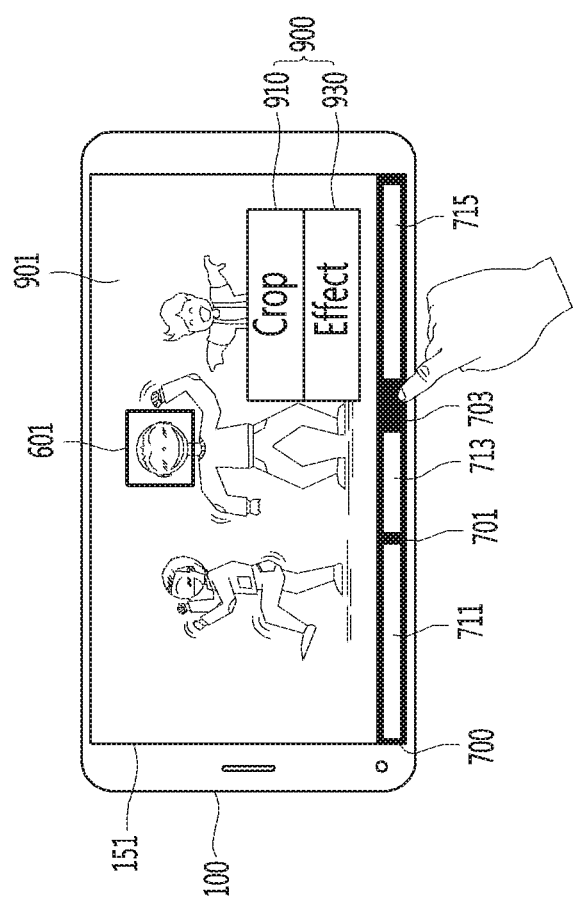

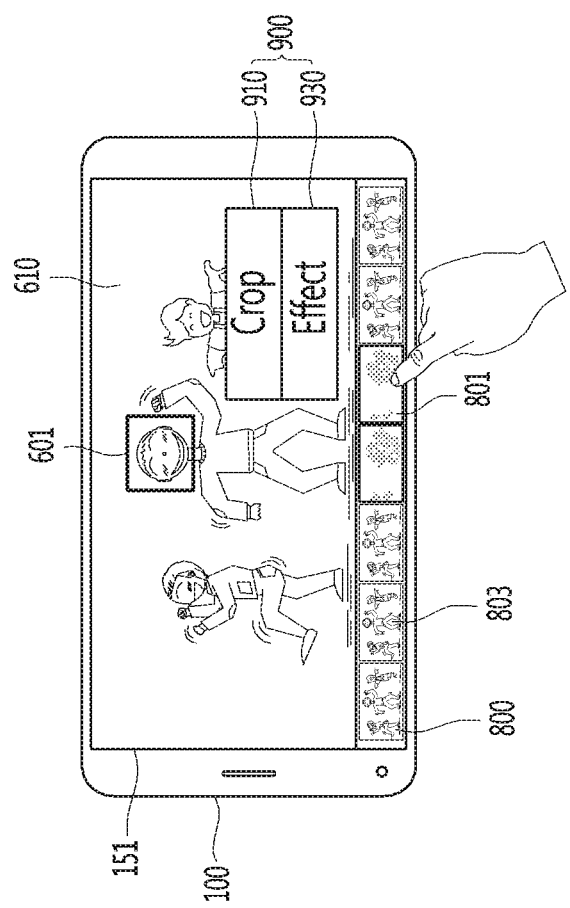

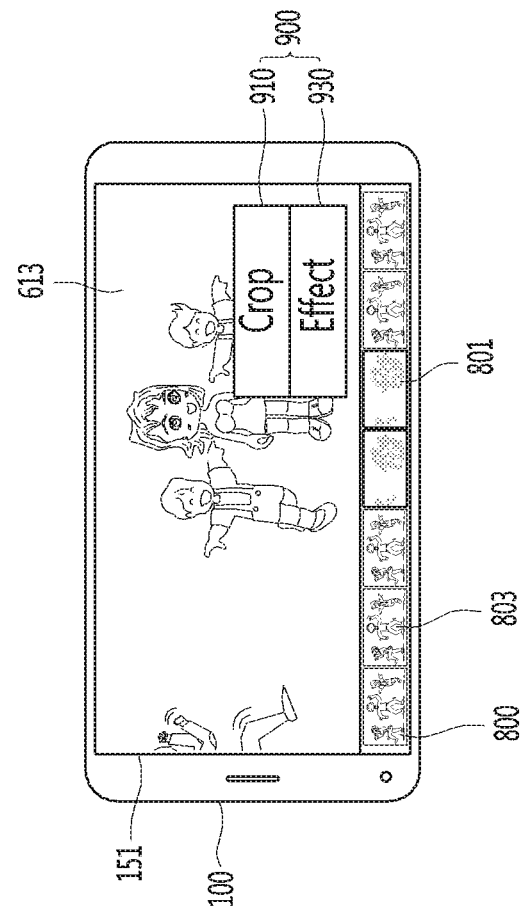

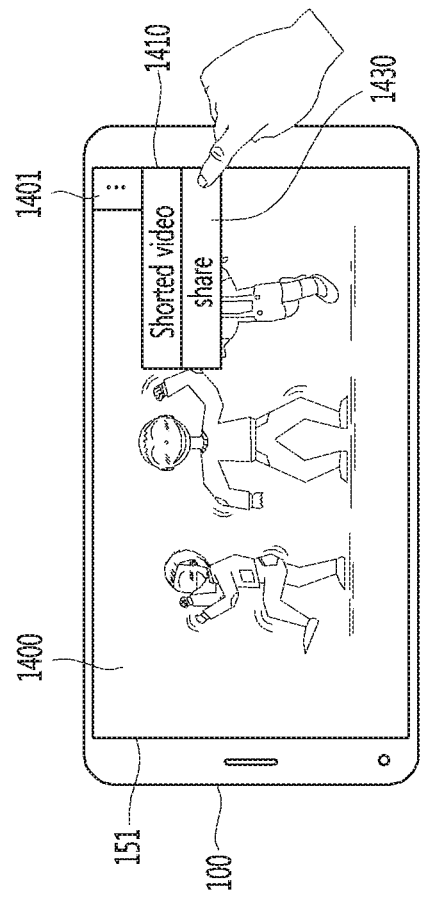
FIG. 15A(1)

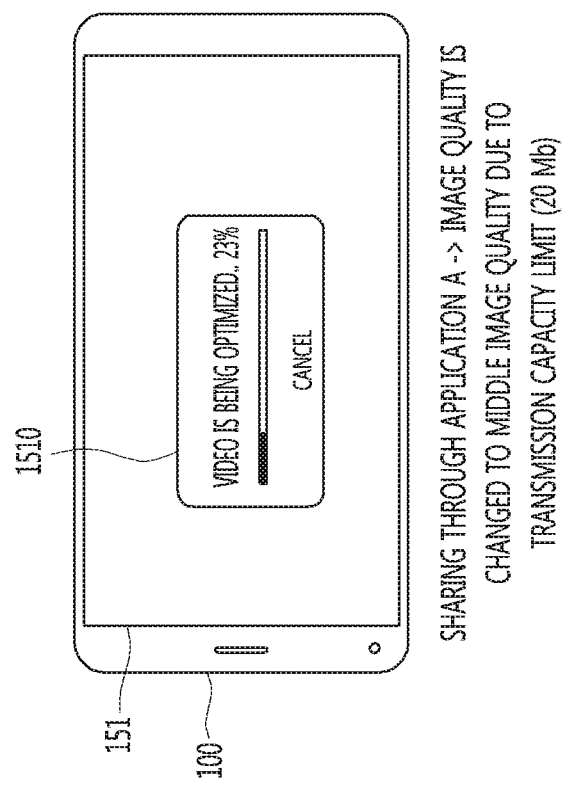

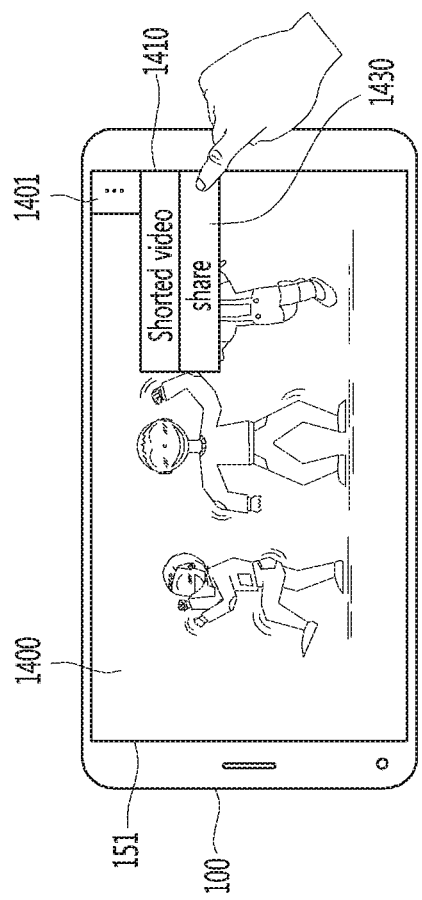

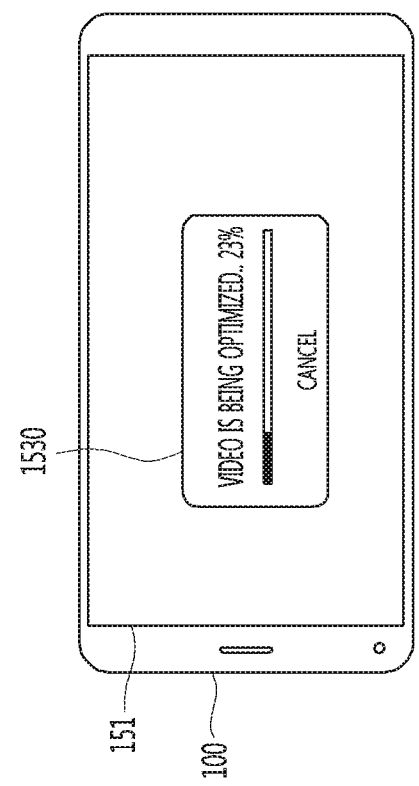

TERMINAL USING INTELLIGENT ANALYSIS FOR DECREASING PLAYBACK TIME OF VIDEO

CROSS-REFERENCE TO RELATED APPLICATIONS

Pursuant to 35 U.S.C. § 119(a), this application claims the benefit of earlier filing date and right of priority to Korean Application No. 10-2017-0060823, filed on May 17, 2017, the contents of which are all hereby incorporated by reference herein in its entirety.

FIELD

The present invention relates to a terminal, and more particularly, to a terminal capable of editing video using intelligent analysis for decreasing playback time of the video.

BACKGROUND

Learning data involves computer engineering and information technology including methods of enabling a computer to perform thinking, learning, self-improvement, etc. capable of being performed by human intelligence, and enables a computer to imitate the intelligent behavior of human beings.

In addition, learning data is directly or indirectly associated with other computer science fields. In particular, today, attempts to introduce learning data elements into various fields of information technology and to solve the problems of the fields have been actively conducted.

Meanwhile, in the related art, context awareness technology for recognizing the situation of a user using learning data and providing desired information to the user in a desired form has been studied.

As context awareness technology has been developed, demand for a mobile terminal capable of performing a function suitable for the situation of a user has increased.

SUMMARY

Accordingly, an embodiment of the present invention is to address the above-noted and other problems.

An embodiment of the present invention is to provide a mobile terminal capable of automatically sensing an insignificant playback section, in which a user is not interested, in video using learning data and rapidly playing back the sensed insignificant playback section.

Another embodiment of the present invention is to provide a mobile terminal capable of deleting or replacing an insignificant playback section by another picture or video using learning data.

Another embodiment of the present invention is to provide a mobile terminal capable of deleting or replacing an insignificant playback section of video by another picture or video.

According to further embodiments of the present invention, a mobile terminal includes a memory configured to store use pattern information of a user, a display unit configured to display video, a learning data unit configured to select an object to be used as an editing criterion of the video based on a result of the learning of the stored use pattern information, to extract one or more first playback sections including the object and one or more second playback sections, which do not include the object, from a plurality of playback sections configuring the video, to delete the one or more second playback sections extracted from the plurality of playback sections of the video, and to decrease a playback time of the video to a predetermined playback time, and a controller configured to play back the video having the predetermined playback time according to a video playback request.

According to another embodiment, a mobile terminal includes a memory configured to store use pattern information of a user, a display unit configured to display video, a learning data unit configured to select an object to be used as an editing criterion of the video based on a result of the learning of the stored use pattern information, to extract one or more first playback sections including the object and one or more second playback sections, which do not include the object, from a plurality of playback sections configuring the video, and to decrease a playback time of the video to a predetermined playback time based on an extracted result, and a controller configured to play back the video having the predetermined playback time according to a video playback request.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIGS. 1B and 1C are views of one example of the mobile terminal, viewed from different directions.

FIGS. 6A(1), 6A(2), 6A(3), 6B(1), 6B(2), 6B(3) are diagrams illustrating a process of sensing an insignificant playback section from an entire playback section of video according to an embodiment of the present invention.

FIGS. 7 and 8 are diagrams illustrating an example of identifying an insignificant playback section while playing back video according to an embodiment of the present invention.

FIGS. 9A-9B, 10A-10C are diagrams illustrating an example of editing an insignificant playback section of video according to an embodiment of the present invention.

FIGS. 15A(1), 15A(2), 15B(1), 15B(2) are diagrams illustrating examples of automatically editing video according to a sharing unit upon sharing video according to an embodiment of the present invention.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" another element, the element can be directly connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of terminals. However, such teachings apply equally to other types of terminals, such as those types noted herein. In addition, these teachings may also be applied to stationary terminals such as digital TV, desktop computers, and the like.

Figure 1A:
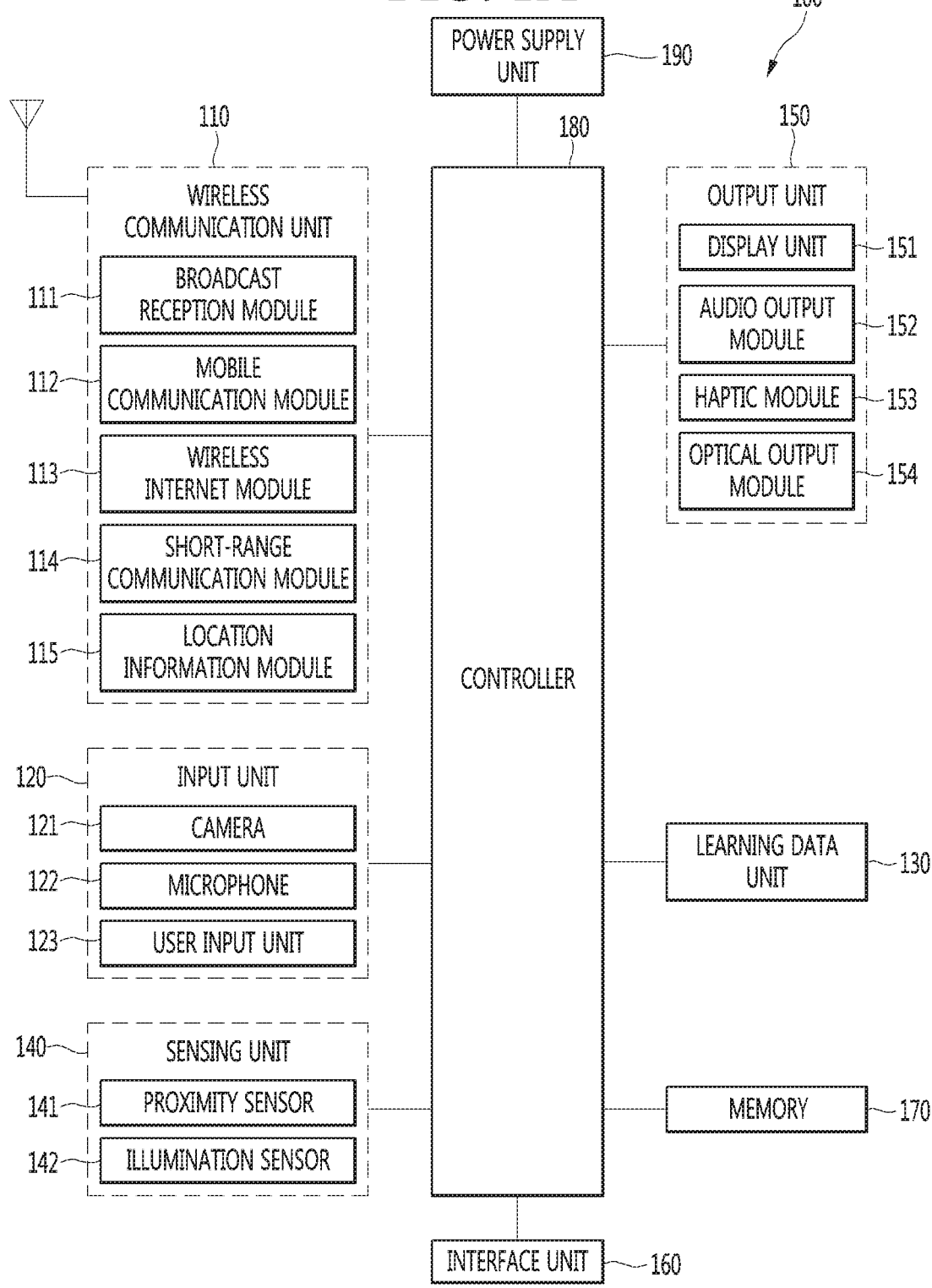
FIG. 1A is a block diagram of a mobile terminal in accordance with the present disclosure.
Figure 1B:
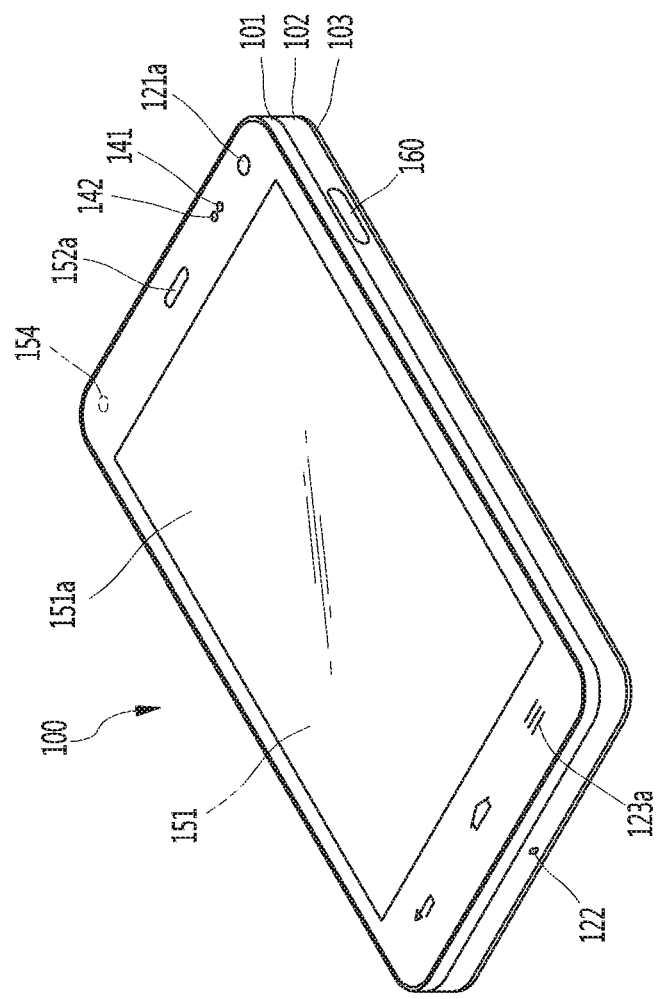

Reference is now made to FIGS. 1A-1C, where FIG. 1A is a block diagram of a terminal in accordance with the present disclosure, FIG. 1B is a perspective view of a front side of a terminal according to an embodiment of the present invention, and FIG. 1C is a rear view of the terminal shown in FIG. 1B.

The terminal 100 may include components, such as a wireless communication unit 110, an input unit 120, learning data unit 130, a sensing unit 140, an output unit 150, an interface unit 160, a memory 170, a controller 180, a power supply unit 190 and the like. FIG. 1A illustrates the terminal having various components, but it is understood that implementing all of the illustrated components is not a requirement, and that greater or fewer components may alternatively be implemented.

In more detail, the wireless communication unit 110 of those components may typically include one or more modules which permit wireless communications between the terminal 100 and a wireless communication system, between the terminal 100 and another terminal 100, or between the terminal 100 and an external server.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The learning data unit 130 may be configured to receive, categorize, store, and output information to be utilized for data mining, data analysis, intelligent decision making, and machine learning algorithms and techniques. The learning data unit 130 may include one or more memory units configured to store data that is received, detected, sensed, generated, predefined, or otherwise output by the terminal, or received, detected, sensed, generated, predefined, or otherwise output by another component, device, terminal, or entity in communication with the terminal.

The learning data unit 130 may include memory incorporated or implemented at the terminal. In some embodiments, learning data unit 130 may be implemented using memory 170. Alternatively or additionally, the learning data unit 130 may be implemented using memory associated with the terminal, such as an external memory directly coupled to the terminal or memory maintained at a server in communication with the terminal. In other embodiments, the learning data unit 130 may be implemented using memory maintained in a cloud computing environment, or other remote memory location that is accessible by the terminal through a communication scheme, such as a network.

The learning data unit 130 is generally configured to store data in one or more databases to identify, index, categorize, manipulate, store, retrieve, and output the data for use in supervised or unsupervised learning, data mining, predictive analytics, or other machine learning techniques. The information stored at the learning data unit 130 may be utilized by the controller 180, or one or more other controllers of the terminal, using any of a variety of different types of data analysis and machine learning algorithms and techniques. Examples of such algorithms and techniques include k-Nearest neighbor systems, fuzzy logic (e.g., possibility theory), neural networks, boltzmann machines, vector quantization, pulsed neural nets, support vector machines, maximum margin classifiers, hill-climbing, inductive logic systems, bayesian networks, petri nets (e.g., finite state machines, mealy machines, moore finite state machines), classifier trees (e.g., perceptron trees, support vector trees, markov trees, decision tree forests, random forests), pandemonium models and systems, clustering, artificially intelligent planning, artificially intelligent forecasting, data fusion, sensor fusion, image fusion, reinforcement learning, augmented reality, pattern recognition, automated planning, and the like.

The controller 180 may request, retrieve, receive, or otherwise utilize the data of the learning data unit 130 to determine or predict at least one executable operation of the terminal based on the information determined or generated using the data analysis and machine learning algorithms and techniques, and control the terminal to execute a predicted or desired operation among the at least one executable operation. The controller 180 may perform various functions implementing emulation of intelligence (i.e., knowledge based systems, reasoning systems, and knowledge acquisition systems); and including systems for reasoning with uncertainty (e.g., fuzzy logic systems), adaptive systems, machine learning systems, artificial neural networks, and the like.

The controller 180 may also include sub-modules to enable its performance and/or execution involving voice and natural speech language processing, such as an I/O processing module, environment condition module, a speech-to-text (STT) processing module, a natural language processing module, a task flow processing module, and a service processing module. Each of these sub-modules may also have access to one or more systems or data and models at the terminal, or a subset or superset thereof, including scheduling, vocabulary index, user data, task flow models, service models, and automatic speech recognition (ASR) systems. In other embodiments, the controller 180 or other aspects of the terminal may be implemented with said sub-modules, systems, or data and models.

In some examples, based on the data at the learning data unit 130, the controller 180 may be configured to perform detecting and sensing a need based on a contextual condition or a user's intent expressed in a user input or natural language input; actively eliciting and/or obtaining information needed to fully determine a need based on the contextual condition or a user's intent (e.g., by analyzing historical data including historical input and output, pattern matching, disambiguating words, input intentions, etc.); determining the task flow for executing a function in response to the need based on the contextual condition or user's intent; and executing the task flow to meet the need based on the contextual condition or user's intent.

In some embodiments, the controller 180 may implement specific hardware elements dedicated for learning data processes including memistors, memristors, transconductance amplifiers, pulsed neural circuits, artificially intelligent nanotechnology systems (e.g., autonomous nanomachines) or artificially intelligent quantum mechanical systems (e.g., quantum neural networks), and the like. In some embodiments, the controller 180 may include pattern recognition systems such as machine vision systems, acoustic recognition systems, handwriting recognition systems, data fusion systems, sensor fusion systems, and soft sensors. Machine vision systems can also include content based image retrieval, optical character recognition, augmented reality, egomotion, tracking or optical flow, and the like.

The controller 180 may be configured to collect, sense, monitor, extract, detect, and/or receive signals or data, via one or more sensing components at the terminal, in order to collect information for processing and storage at the learning data unit 130 and for use in data analysis and machine learning operations. Collection of information may include sensing information through a sensor, extracting information stored in the memory, such as memory 170, or receiving information from another terminal, entity, or an external storage through communication means. Thus in one example, the controller 180 may collect historical usage information at the terminal, store the historical usage information for use in data analytics, and at a future occurrence, determine a best match for executing a particular function using predictive modeling based on the stored historical usage information.

The controller 180 may also receive or sense information of the surrounding environment, or other information, through the sensing unit 140. In addition, the controller 180 may receive broadcast signals and/or broadcast-related information, wireless signals, wireless data, and the like through the wireless communication unit 110. The controller 180 may also receive image information (or a corresponding signal), audio information (or a corresponding signal), data, or user-input information from an input unit.

The controller 180 may collect information in real time, and process or categorize the information (for example, in a knowledge graph, command policy, personalization database, dialog engine, etc.), and store the processed information in the memory 170 or the learning data unit 130.

If the operation of the terminal is determined based on data analysis and machine learning algorithms and techniques, the controller 180 may control the components of the terminal to execute the determined operation. The controller 180 may then execute the determined operation by controlling the terminal based on the control command.

In some embodiments, if a specific operation is executed, the controller 180 may analyze history information indicating the execution of the specific operation through data analysis and machine learning algorithms and techniques and execute updating of previously-learned information based on the analyzed information. Accordingly, the controller 180, in combination with the learning data unit 130, can improve the accuracy of future performance of the data analysis and machine learning algorithms and techniques based on the updated information.

The sensing unit 140 may include at least one sensor which senses at least one of internal information of the terminal, a surrounding environment of the terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output unit 152, a haptic module 153, an optical output unit 154 and the like. The display unit 151 may have an inter-layered structure or an integrated structure with a touch sensor so as to implement a touch screen. The touch screen may provide an output interface between the terminal 100 and a user, as well as functioning as the user input unit 123 which provides an input interface between the terminal 100 and the user.

The interface unit 160 may serve as an interface with various types of external devices connected with the terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The terminal 100 may execute an appropriate control associated with a connected external device, in response to the external device being connected to the interface unit 160.

The memory 170 may store a plurality of application programs (or applications) executed in the terminal 100, data for operations of the terminal 100, instruction words, and the like. At least some of those application programs may be downloaded from an external server via wireless communication. Some others of those application programs may be installed within the terminal 100 at the time of being shipped for basic functions of the terminal 100 (for example, receiving a call, placing a call, receiving a message, sending a message, etc.). On the other hand, the application programs may be stored in the memory 170, installed in the terminal 100, and executed by the controller 180 to perform an operation (or a function) of the terminal 100.

The controller 180 may typically control an overall operation of the terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Terminal 100 is shown implemented with one controller 180 facilitating operation of all of the various units (e.g., wireless communication unit 110, input unit 120, learning data unit 130, sensing unit 140, output unit 150, interface unit 160, etc.) and submodules shown in the figure. However, one or more separate controllers 180 may alternatively be implemented for any or all of such units and submodules.

Furthermore, the controller 180 may control at least part of the components illustrated in FIG. 1A, in order to drive the application programs stored in the memory 170. In addition, the controller 180 may drive the application programs by combining at least two of the components included in the terminal 100 for operation.

The power supply unit 190 may receive external power or internal power and supply appropriate power required for operating respective elements and components included in the terminal 100 under the control of the controller 180. The power supply unit 190 may include a battery, and the battery may be an embedded battery or a replaceable battery.

At least part of those elements and components may be combined to implement operation and control of the terminal or a control method of the terminal according to various exemplary embodiments described herein. Also, the operation and control or the control method of the terminal may be implemented in the terminal in such a manner of activating at least one application program stored in the memory 170.

Hereinafter, each aforementioned component will be described in more detail with reference to FIG. 1A, prior to explaining various exemplary embodiments implemented by the terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the terminal 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like). The wireless signals may include audio call signal, video (telephony) call signal, or various formats of data according to transmission/reception of text/multimedia messages.

The wireless Internet module 113 denotes a module for wireless Internet access. This module may be internally or externally coupled to the terminal 100. The wireless Internet module 113 may transmit/receive wireless signals via communication networks according to wireless Internet technologies. Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the terminal 100 and a wireless communication system, between the terminal 100 and another terminal 100, or between the terminal and a network where another terminal 100 (or an external server) is located, via wireless personal area networks.

Here, the another terminal 100 may be a wearable device, for example, a smart watch, smart glasses or a head mounted display (HMD), which is able to exchange data with the terminal 100 (or to like data with the terminal 100). The short-range communication module 114 may sense (recognize) a wearable device, which is able to communicate with the terminal), near the terminal 100. In addition, if the sensed wearable device is a device which is authenticated to communicate with the terminal 100 according to the present disclosure, the controller 180 may transmit at least part of data processed in the terminal 100 to the wearable device via the short-range communication module 114. Hence, a user of the wearable device may use the data processed in the terminal 100 on the wearable device. For example, if a call is received in the terminal 100, the user may answer the call using the wearable device. Also, if a message is received in the terminal 100, the user may check the received message using the wearable device.

The location information module 115 denotes a module for detecting or calculating a position of the terminal. An example of the location information module 115 may include a Global Position System (GPS) module or a Wi-Fi module. For example, if the terminal uses the GPS module, a position of the terminal may be acquired using a signal sent from a GPS satellite. As another example, if the terminal uses the Wi-Fi module, a position of the terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the terminal. As a module used to acquire the location (or current location) of the terminal, the location information module 115 may not be necessarily limited to a module for directly calculating or acquiring the location of the terminal.

Next, the input unit 120 may be configured to provide an audio or video signal (or information) input to the terminal or information input by a user to the terminal. For the input of the audio information, the terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the terminal 100 may be arranged in a matrix configuration. By use of the cameras 121 having the matrix configuration, a plurality of image information having various angles or focal points may be input into the terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the terminal 100 (or an application program being executed). On the other hand, the microphone 122 may include assorted noise removing algorithms to remove noise generated in the course of receiving the external audio signal.

The user input unit 123 may receive information input by a user. If information is input through the user input unit 123, the controller 180 may control an operation of the terminal 100 to correspond to the input information. The user input unit 123 may include a mechanical input element (or a mechanical key, for example, a button located on a front/rear surface or a side surface of the terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the terminal, surrounding environment information of the terminal and user information, and generate a sensing signal corresponding to it. The controller 180 may control an operation of the terminal 100 or execute data processing, a function or an operation associated with an application program installed in the terminal based on the sensing signal. Hereinafter, description will be given in more detail of representative sensors of various sensors which may be included in the sensing unit 140.

First, a proximity sensor 141 refers to a sensor to sense presence or absence of an object approaching a surface to be sensed, or an object disposed near a surface to be sensed, by using an electromagnetic field or infrared rays without a mechanical contact. The proximity sensor 141 may be arranged at an inner region of the terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. If the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized as a proximity sensor.

On the other hand, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

If touch inputs are sensed by the touch sensors as described above, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. In more detail, the position of the wave generation source may be calculated by using a time difference from the time that the ultrasonic wave reaches the sensor based on the light as a reference signal.

The camera 121 of the input unit 120 may be a type of camera sensor. The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the terminal 100. For example, the display unit 151 may display execution screen information of an application program driven in the terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output unit 152 may output audio data received from the wireless communication unit 110 or stored in the memory 170 in a call signal reception mode, a call mode, a record mode, a voice recognition mode, a broadcast reception mode, and the like. Also, the audio output unit 152 may also provide audible output signals related to a particular function (e.g., a call signal reception sound, a message reception sound, etc.) performed by the terminal 100. The audio output unit 152 may include a receiver, a speaker, a buzzer or the like.

A haptic module 153 may generate various tactile effects that can be felt by a user. A representative example of tactile effect generated by the haptic module 153 may be vibration. The intensity, pattern and the like of vibration generated by the haptic module 153 may be controlled by a user's selection or the settings of the controller. For example, the haptic module 153 may output different vibrations in a combined manner or in a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the terminal 100.

An optical output unit 154 may output a signal for indicating an event generation using light of a light source. Examples of events generated in the terminal 100 may include a message reception, a call signal reception, a missed call, an alarm, a schedule notice, an email reception, an information reception through an application, and the like. A signal output by the optical output unit 154 may be implemented in such a manner that the terminal emits monochromatic light or light with a plurality of colors. The signal output may be terminated as the terminal senses a user's event checking.

The interface unit 160 may serve as an interface with every external device connected with the terminal 100. For example, the interface unit 160 may receive data transmitted from an external device, receive power to transfer to each element within the terminal 100, or transmit internal data of the terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

Furthermore, if the terminal 100 is connected with an external cradle, the interface unit 160 may serve as a passage to allow power from the cradle to be supplied to the terminal 100 therethrough or may serve as a passage to allow various command signals input by the user from the cradle to be transferred to the terminal therethrough. Various command signals or power input from the cradle may operate as signals for recognizing that the terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the terminal 100 may be operated in relation to a web storage device that performs the storage function of the memory 170 over the Internet or other network.

As aforementioned, the controller 180 may typically control the general operations of the terminal 100. For example, the controller 180 may set or release a lock state for restricting a user from inputting a control command with respect to applications if a state of the terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 may receive external power or internal power and supply appropriate power required for operating respective elements and components included in the terminal 100 under the control of the controller 180. The power supply unit 190 may include a battery. The battery may be an embedded battery which is rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, certain embodiments described herein may be implemented with separate software modules, such as procedures and functions, each of which perform one or more of the functions and operations described herein. The software codes can be implemented with a software application written in any suitable programming language and may be stored in memory (for example, memory 170), and executed by a controller or processor (for example, controller 180).

Referring to FIGS. 1B and 1C, the terminal 100 disclosed herein may be implemented using a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of terminal or on a specific type of terminal will be also typically applied to another type of terminal. The terminal body may be formed using at least one assembly.

The terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, if the rear cover 103 is detached from the rear case 102, the electronic components mounted to the rear case 102 may be externally exposed.

As illustrated, if the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the terminal 100 may be configured such that one case forms the inner space. In this example, a terminal 100 having a uni-body formed in such a manner that synthetic resin or metal extends from a side surface to a rear surface may also be implemented.

On the other hand, the terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space if those cases are coupled.

The terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the terminal 100. For example, the display unit 151 may display execution screen information of an application program driven in the terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using two or more displays. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. If a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Alternatively, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the terminal 100.

The optical output module 154 may output light for indicating an event generation. Examples of the event generated in the terminal 100 may include a message reception, a call signal reception, a missed call, an alarm, a schedule notice, an email reception, information reception through an application, and the like. If a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger if the user grabs the terminal body with one hand. However, the present disclosure may not be limited to this, and the position of the rear input unit may be changeable.

If the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, if the first manipulation unit 123a is not disposed on the front surface of the terminal body, the display unit 151 may be implemented to have a larger screen.

On the other hand, the terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' If the second camera 121b is implemented as the array camera, images may be captured in various manners using the plurality of lenses and images with better qualities may be obtained.

A flash 124 may be disposed adjacent to the second camera 121b. If an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1B), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the terminal 100 may be disposed on the terminal body. The power supply unit 190 may include a battery which is mounted in the terminal body or detachably coupled to an outside of the terminal body.

The battery may receive power via a power source cable connected to the interface unit 160. Also, the battery may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery, so as to prevent separation of the battery and protect the battery from an external impact or foreign materials. If the battery is detachable from the terminal body, the rear case 103 may be detachably coupled to the rear case 102.

An accessory for protecting an appearance or assisting or extending the functions of the terminal 100 may further be provided on the terminal 100. As one example of the accessory, a cover or pouch for covering or accommodating at least one surface of the terminal 100 may be provided. The cover or pouch may cooperate with the display unit 151 to extend the function of the terminal 100. Another example of the accessory may be a touch pen for assisting or extending a touch input onto a touch screen.

Figure 2:
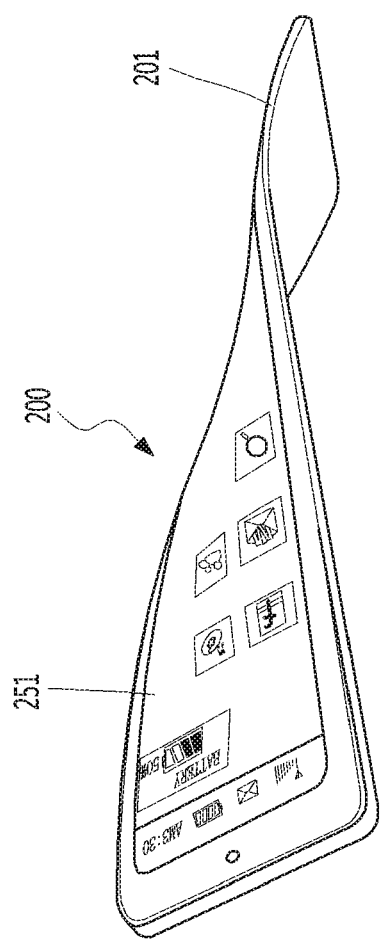
FIG. 2 is a view of a deformable mobile terminal according to an alternative embodiment of the present disclosure.

FIG. 2 is a view of a deformable mobile terminal according to an alternative embodiment of the present disclosure. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

If in a state that the flexible display unit 251 is not deformed (for example, in a state with an infinite radius of curvature and referred to as a first state), a display region of the flexible display unit 251 includes a generally flat surface. If in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, if an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. If a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, if the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, if a call is received in the mobile terminal 100, the user can answer the call using the wearable device. Also, if a message is received in the mobile terminal 100, the user can check the received message using the wearable device.

Figure 3:
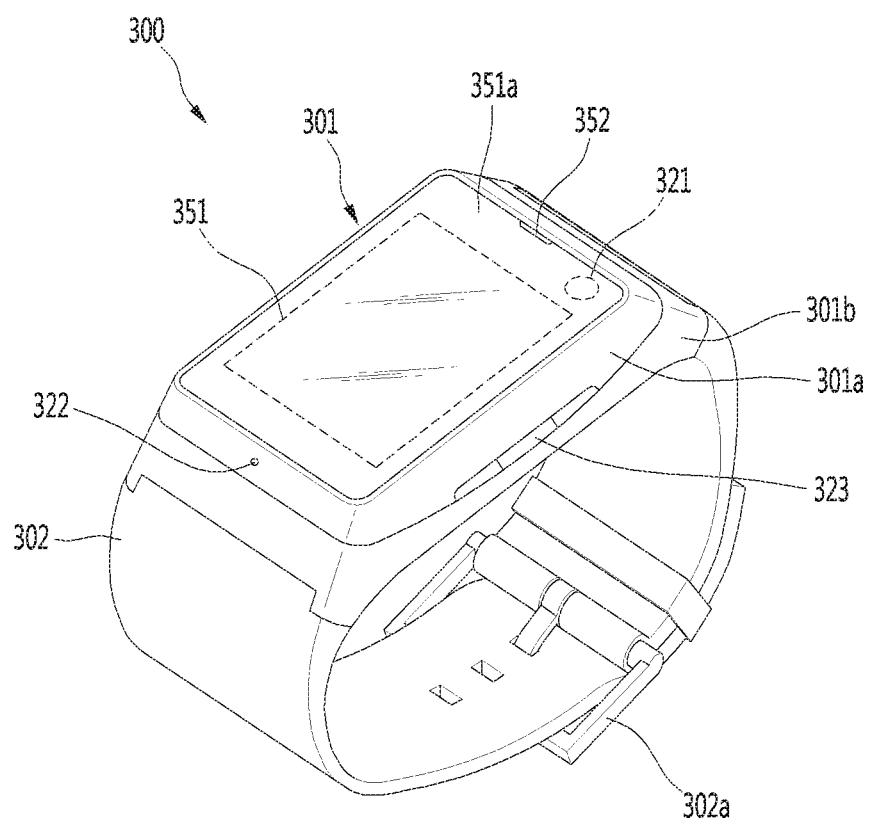
FIG. 3 is a view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. If the display unit 351 is implemented as a touch screen, additional function keys may be minimized or eliminated. For example, if the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
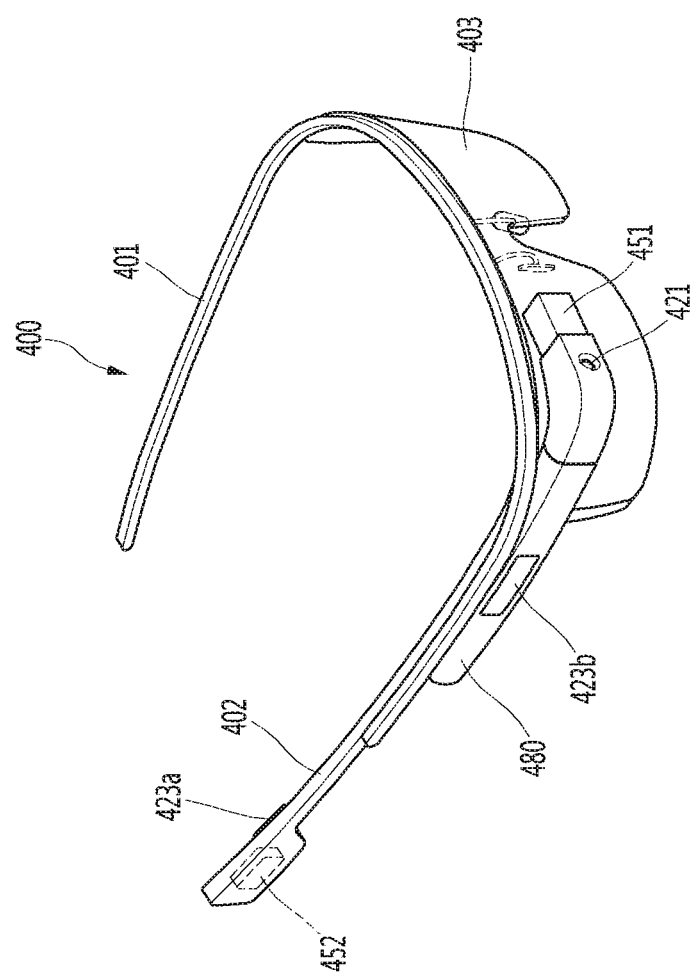
FIG. 4 is a view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes if the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423*a* and 423*b*, which can each be manipulated by the user to provide an input. The user input units 423*a* and 423*b* may employ techniques which permit input via a tactile input. Typical tactile inputs include a touch, push, or the like. The user input units 423*a* and 423*b* are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. If the audio output module 452 is implemented in the osteoconductive manner, the audio output module 452 may be closely adhered to the head if the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised if the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold if the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

If the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 5A:
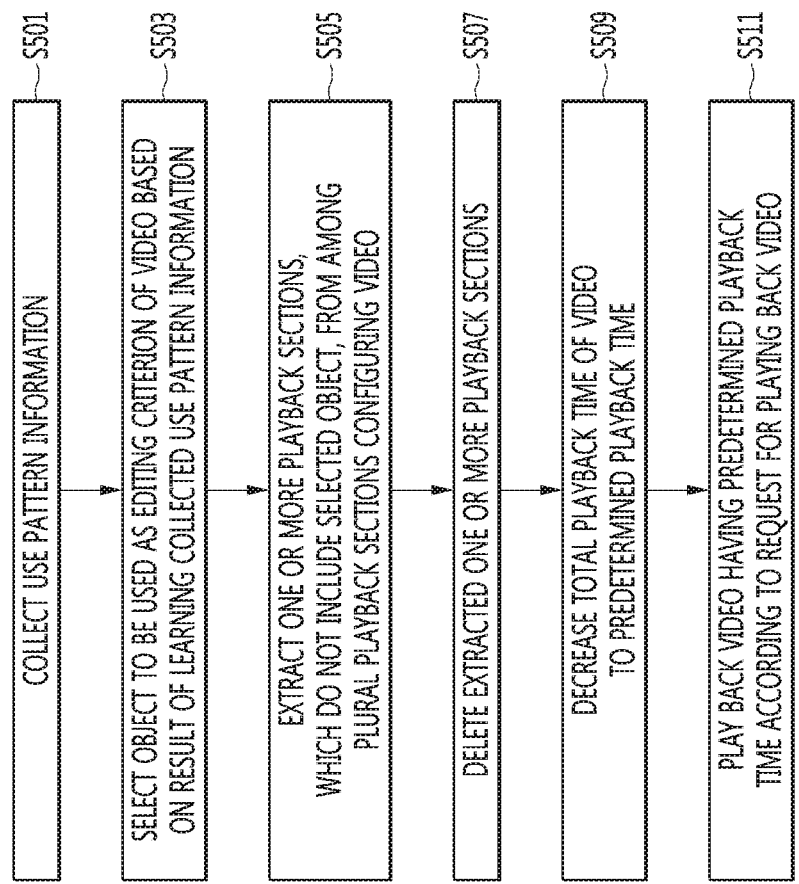
FIGS. 5A-5C are flowcharts illustrating methods of operating a mobile terminal according to an embodiment of the present invention.

FIG. 5A is a flowchart illustrating a method of operating a mobile terminal according to an embodiment of the present invention. In particular, FIG. 5A shows an embodiment of extracting an object to be used as an editing criterion of video based on use pattern information of a user who uses the mobile terminal, deleting one or more playback sections, which do not include the extracted object, and decreasing a total playback time of the video to a playback time desired by a user. An example is presented such that the entire playback section of the video is composed of a plurality of playback sections. In addition, each of the plurality of playback sections may include a plurality of image frames.

The playback times of the plurality of playback sections may be equal or different. In addition, although the learning data unit 130 is described as being provided separately from the controller 180, the present invention is not limited thereto and the learning data unit 130 may be included in the controller 180.

Referring to FIG. 5A, the learning data unit 130 of the mobile terminal 100 collects use pattern information of a user (S501).

In one embodiment, the use pattern information of the user is information on the pattern of using the mobile terminal 100 by the user and may include information on use of a specific function or application of the mobile terminal 100. The use pattern information may be information recorded according to use of a specific application. For example, the use pattern information may be pictures, which are captured by the camera 121 through execution of a camera application and stored in the memory 170. Alternatively, the use pattern information may be information on a person who has a telephone conversion with the user through execution of a telephone call application.

The learning data unit 130 selects an object to be used as an editing criterion of video, based on a result of learning the collected use pattern information (S503). In one embodiment, the learning data unit 130 may select the object to be used as the editing criterion of the video using machine learning technology. A method of selecting an object to be used as the editing criterion of the video using a machine learning technology will be described below.

In another embodiment, the learning data unit 130 may receive a user command and select the object, without using the result of learning the use pattern information. For example, if a command for touching an object is received while playing back the video, the learning data unit 130 may select the touched object as an object to be used as the editing criterion of the video. Alternatively, the learning data unit 130 may select an object through voice received through the microphone 122. More specifically, the learning data unit 130 may convert voice received through the microphone 122 into text and select the object as the object to be used as the editing criterion of the video, if the converted text indicates the name of the object.

The learning data unit 130 extracts one or more playback sections, which do not include the selected object, from among the plurality of playback sections configuring the video (S505) and deletes the extracted one or more playback sections (S507). The learning data unit 130 may extract one or more first playback sections including the selected object and one or more second playback sections, which do not include the selected object, from among the plurality of playback sections configuring the video. The learning data unit 130 may delete the extracted one or more second playback sections, which do not include the selected object. The learning data unit 130 may determine whether the selected object is included in all image frames configuring the video. If image frames, which do not include the selected object, are consecutive, the learning data unit 130 may extract the consecutive image frames, which do not include the selected object, as one playback section.

Here, each of one or more playback sections, which do not include the selected object, may be referred to as an insignificant playback section in which the user is not interested.

In contrast, the playback section including the selected object may be a significant playback section in which the user is interested.

The learning data unit 130 decreases the total playback time of the video to a predetermined playback time based on a result of deleting the extracted one or more playback sections (S509). In one embodiment, the predetermined playback time may be predetermined according to user settings. For example, if the total playback time of the video is one hour and the predetermined playback time is 20 minutes, the learning data unit 130 may delete the extracted one or more playback sections and decrease the total playback time of the video to the predetermined playback time.

In one embodiment, the learning data unit 130 may play back the undeleted playback sections at a predetermined speed or more, if the total playback time of the video is greater than the predetermined playback time after deleting the extracted one or more playback sections. That is, if the playback speed of the undeleted playback section is a first playback speed, the learning data unit 130 may change the playback speed of the undeleted playback section to a second playback speed greater than the first playback speed. Therefore, the total playback time of the video may be adjusted to the predetermined playback time.

In another embodiment, the learning data unit 130 may play back the undeleted playback sections at less than the predetermined speed, if the total playback time of the video is less than the predetermined playback time after deleting the extracted one or more playback sections. That is, if the playback speed of the undeleted playback sections is a third playback speed, the learning data unit 130 may change the playback speed of the undeleted playback sections to a fourth playback speed less than the third playback speed. Therefore, the total playback time of the video may be adjusted to the predetermined playback time.

In another embodiment, the predetermined playback time may be determined according to a user voice command. For example, if the user voice command received through the microphone 122 indicates that the total playback time of the video is changed to the predetermined playback time, the learning data unit 130 may decrease the total playback time of the video to the predetermined playback time according to the voice command. The controller 180 plays back the video having the predetermined playback time according to a video playback request (S511).

Figure 5B:
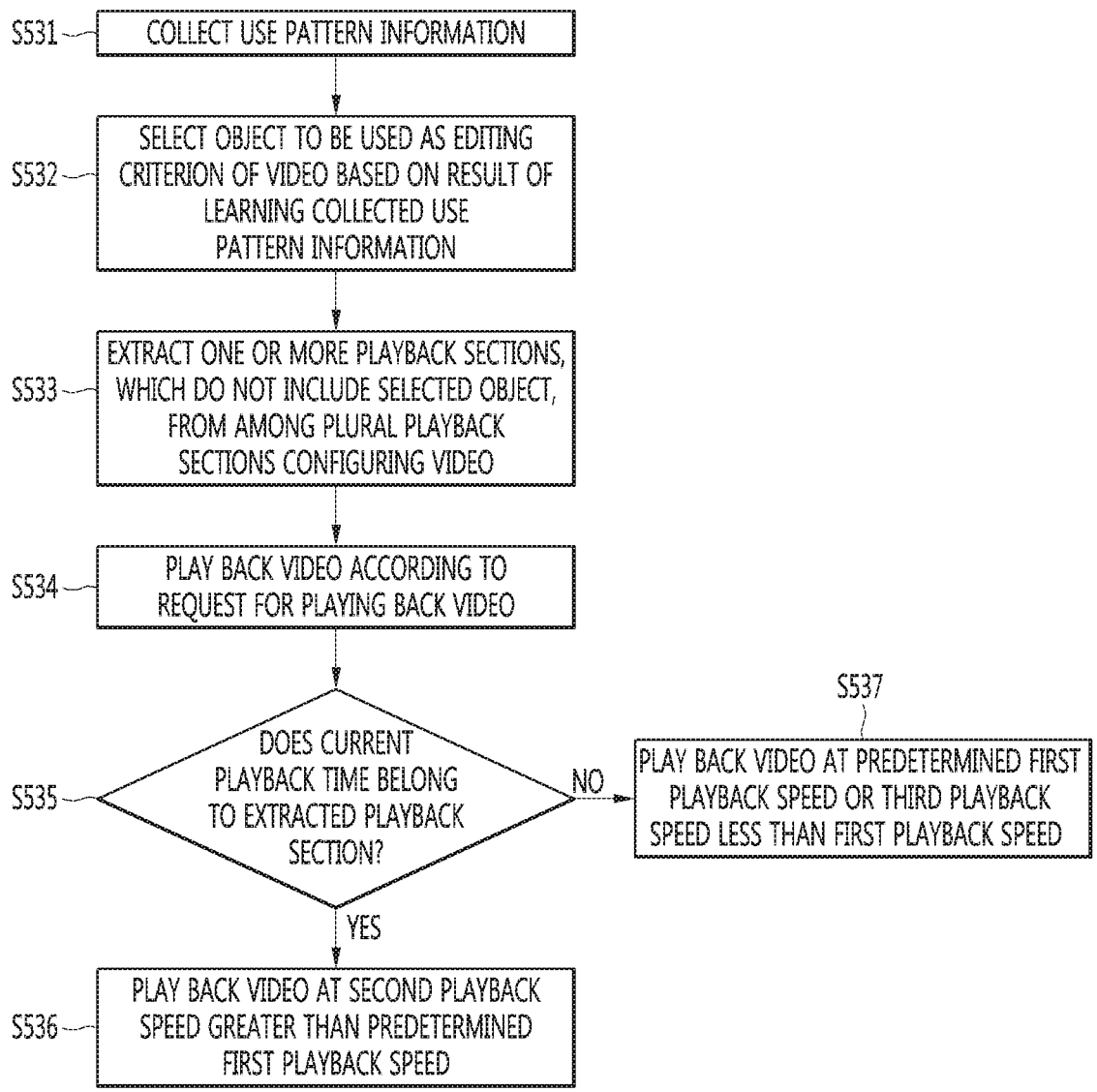

FIG. 5B is a flowchart illustrating a method of operating a mobile terminal according to another embodiment of the present invention. In particular, FIG. 5B shows an embodiment of extracting an object to be used as an editing criterion of video based on use pattern information of a user who uses the mobile terminal 100, rapidly playing back one or more playback sections, which do not include the extracted object, and decreasing a total playback time of video to a playback time desired by a user. A detailed description of the same portions of FIG. 5B as those of FIG. 5A are omitted.

Referring still to FIG. 5B, the learning data unit 130 of the mobile terminal 100 collects use pattern information of the user (S531). The learning data unit 130 selects an object to be used as an editing criterion of video based on a result of learning the collected use pattern information (S532). The learning data unit 130 extracts one or more playback sections, which do not include the selected object, from among the plurality of playback sections configuring the video (S533).

The one or more playback sections, which do not include the selected object, among the plurality of playback sections may be playback sections which are determined as insignificant portions if the user views the video based on the information stored in the mobile terminal 100 of the user in the entire playback section of the video.

The learning data unit 130 may sense a playback section, which does not include the selected object, from the entire playback section of the video based on the information stored in the memory 170. A specific object may be acquired based on the information stored in the memory 170. For example, the learning data unit 130 may sense the playback section, which does not include the selected object, based on the pictures stored in the memory 170. More specifically, if the number of pictures including the face of a specific person among the pictures stored in the memory 170 is equal to or greater than a predetermined value, the learning data unit 130 may determine the playback section, which does not include the specific person, as an insignificant playback section.

As another example, the learning data unit 130 may extract the insignificant playback section of the video based on the contact information of other persons stored in the memory 170. Specifically, the learning data unit 130 may recognize the face of the specific person stored in a contact address book if the number of times of having a telephone conversation with the specific person is equal to or greater than a predetermined value. The learning data unit 130 may extract the playback section, which does not include the face of the specific person, of the entire playback section of the video as the insignificant playback section.

In another embodiment, the learning data unit 130 may sense motion of the playback section while playing back the video, and extract the playback section, in which motion occurs, as the insignificant playback section.

In another embodiment, the learning data unit 130 may sense the insignificant playback section based on the voice of the user input through the microphone 122. For example, if the voice of the user input through the microphone 122 is the name of a specific user, the learning data unit 130 may recognize the facial image corresponding to the name of the specific person stored in the memory 170. For example, the name and facial image of the person may be stored in the contact address book.

The learning data unit 130 may extract the facial image corresponding to the name of the specific person and sense the playback section of image frames, in which the facial image of the person having the input name does not appear, from the entire playback section of the video as the insignificant playback section. The learning data unit 130 may determine the playback sections except for the insignificant playback section as playback sections significant upon viewing the video, if the insignificant playback section is sensed from the entire playback section of the video.

Features of block S533 will be described in more detail below.

The controller 180 plays back the video, as a video playback request is received (S534). The controller 180 determines whether the current playback time of the video belongs to one or more playback sections extracted in step S533 (S535). If the current playback time of the video belongs to one or more playback sections, the controller 180 plays back the playback section at a second playback speed greater than a predetermined first playback speed (S536).

In one embodiment, if the video is captured through the camera 121 provided in the mobile terminal 100, the predetermined first playback speed may be set upon capturing. The capturing speed may be a frame rate. In another embodiment, the first playback speed may be set by the user upon playing back the video. In one embodiment, the controller 180 may determine that the user is not interested in the insignificant playback section and increase the playback speed of the video, if the current playback time of the video reaches the insignificant playback section. Increasing the playback speed of the insignificant playback section may include performing time lapse processing with respect to the insignificant playback section. Time lapse processing may mean that the playback speed is adjusted and the playback section of the video captured for a long time is compressed, thereby playing back the video for a short time.

In another embodiment, the controller 180 may perform time lapse processing with respect to the insignificant playback section and decrease the resolution of the insignificant playback section to be lower than that of the significant playback section. For example, the learning data unit 130 may convert the resolution of the insignificant playback section into SD, if the resolution of the significant playback section is HD.

The learning data unit 130 may store the edited video, in which the resolution of the insignificant playback section is converted into SD, in the memory 170. If the current playback time of the video does not belong to the extracted one or more playback sections, the controller 180 plays back the playback section at the predetermined first playback speed or a third playback speed less than the first playback speed (S536).

In one embodiment, if the current playback time of the video does not belong to the extracted one or more playback sections, the controller 180 may play back the playback section (the section including the selected object) at the predetermined first playback speed.

In another embodiment, if the current playback time of the video does not belong to the extracted one or more playback sections, the controller 180 may play back the playback section (the section including the selected object) at the third playback speed less than the predetermined first playback speed. That is, since the user is interested in this section, the controller 180 may decrease the playback speed such that the user views the section of interest for a longer time. In addition, the learning data unit 130 may determine the playback speed of one or more playback sections including the selected object and the playback speed of the other playback sections.

The learning data unit 130 may change the total playback time of the video to the predetermined playback time according to the result of determination. The learning data unit 130 may determine the playback speed of the playback section including the selected object to the second playback speed, and determine the playback speed of the playback section, which does not include the selected object, to the first or third playback speed and decrease the total playback time of the video to the predetermined playback speed.

If the playback section in which the user is not interested, of the entire playback section of the video is automatically extracted and rapidly played back, the user can view only desired portions with concentration. In addition, the user does not need to select a button such as a fast forward button or a back button in order to view only the desired portions of the video, thereby improving convenience. Additionally, the controller 180 may store edited video, in which the playback speeds of the significant playback section and the insignificant playback section are different, and original video, in which the playback speeds of the significant playback section and the insignificant playback section are the same, in the memory 170.

Next, a process of selecting an object to be used as an editing criterion of video based on the result of learning use pattern information will be described.

Figure 5C:
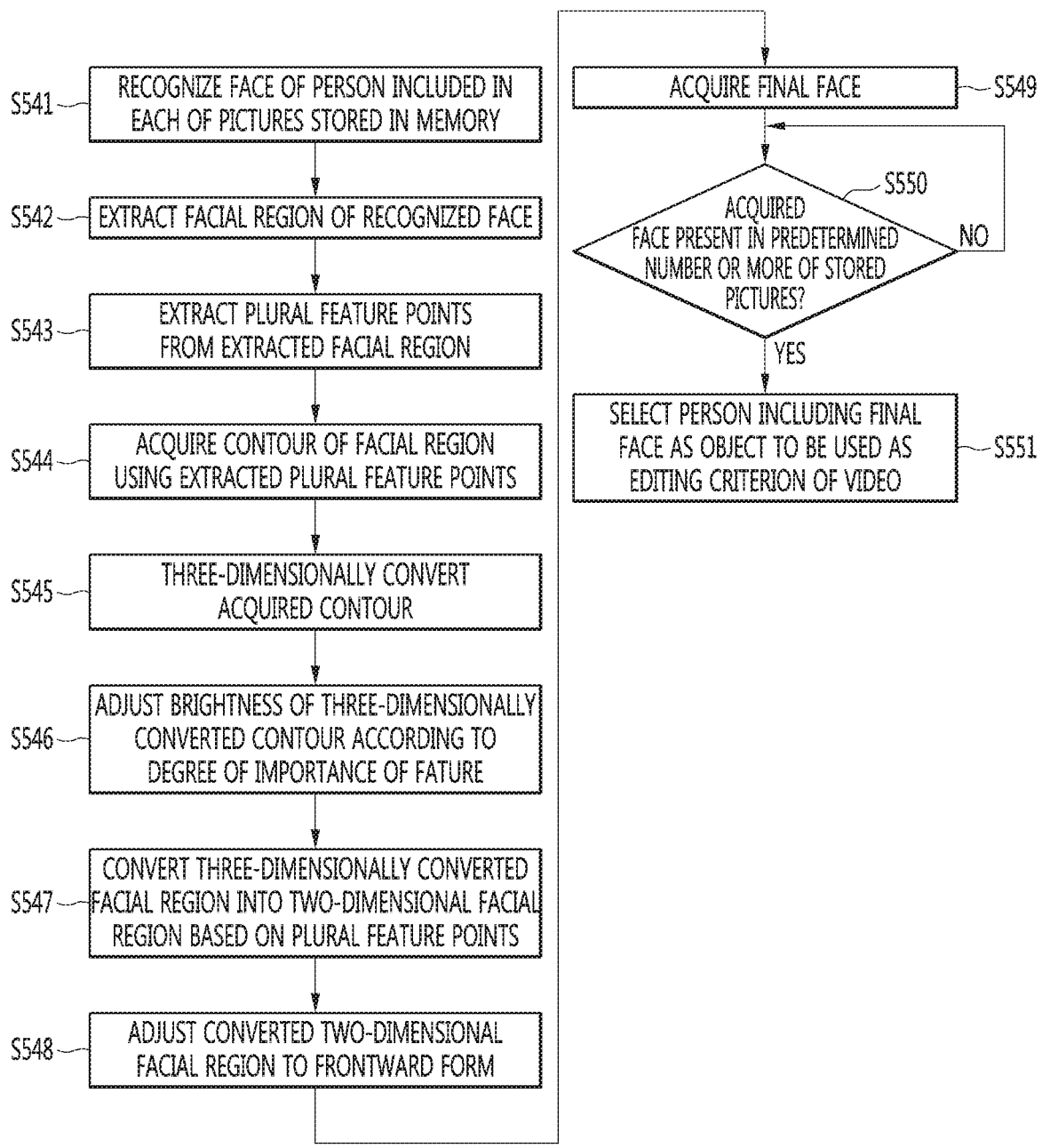
Figure 5D:
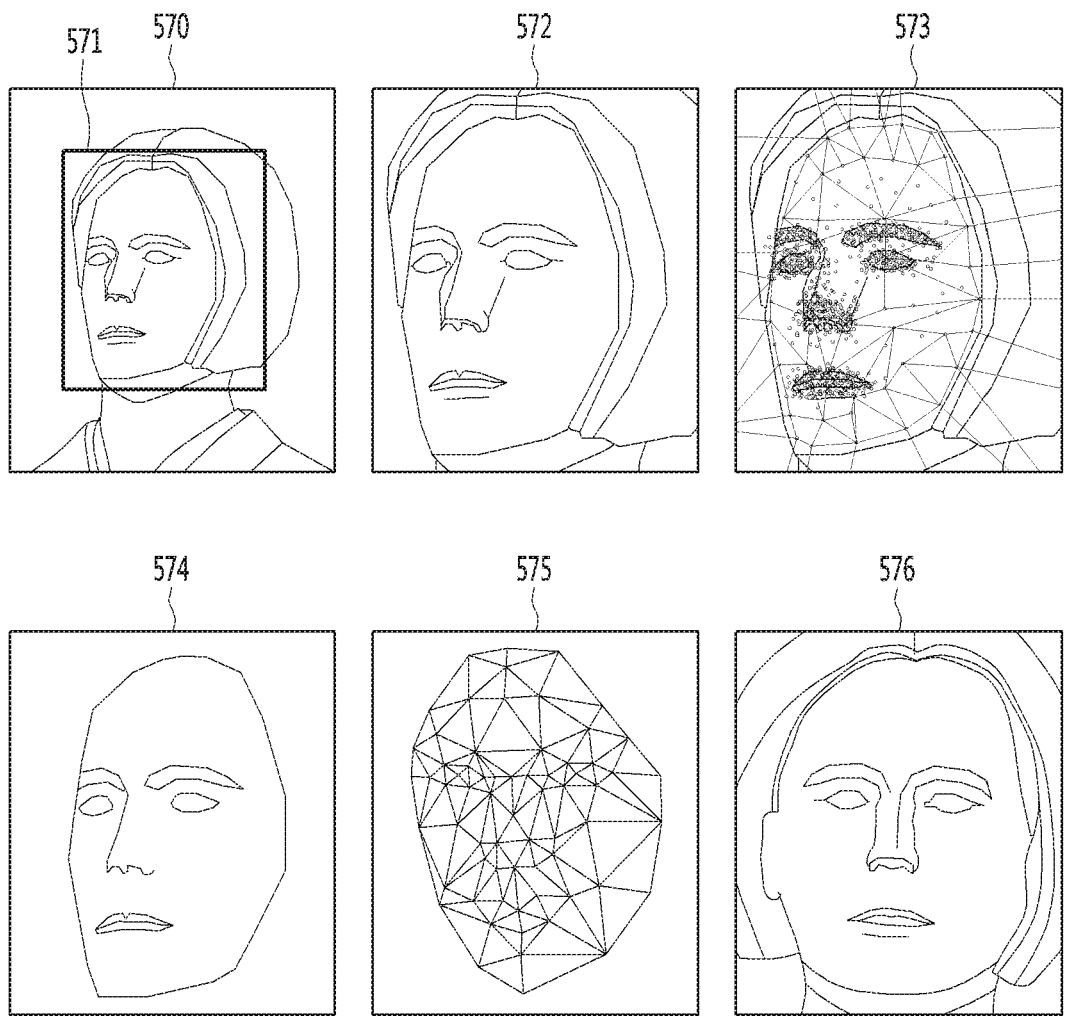
FIG. 5D illustrate a facial recognition method.

FIG. 5C is a flowchart illustrating a method of selecting an object to be used as an editing criterion of video through recognition of the face of a person included in a picture stored in a memory according to an embodiment of the present invention and FIG. 5D is a diagram illustrating a process of acquiring a final face included in a picture according to an embodiment of the present invention.

In FIG. 5C, the learning data unit 130 recognizes the faces of persons from a plurality of pictures stored in the memory 170 (S541). The plurality of pictures stored in the memory 170 may be displayed through execution of a gallery application. Each picture may be any one of the pictures captured through the camera 121 or pictures received from an external device.

Referring to FIG. 5D, a picture 570 is shown. The learning data unit 130 may recognize the face 571 of the person from the picture 570. For example, the learning data unit 130 may recognize the face 571 of the person based on the color of the picture 570. That is, the learning data unit 130 may recognize a region having a predetermined skin color in the picture 570.

As another example, the learning data unit 130 may detect facial elements and recognize the face 571. Specifically, the learning data unit 130 may pre-acquire the locations of the facial elements such as eyes, nose and mouth, calculate feature vectors between the elements, and detect the face 571.

The learning data unit 130 extracts the facial region from the recognized face (S542). The learning data unit 130 may extract the facial region 572 corresponding to the recognized face. The learning data unit 130 extracts a plurality of feature points from the extracted facial region (S543). In one embodiment, each of the plurality of feature points may be extracted from each of the facial elements (eyes, nose, mouth, eyebrows, forehead, etc.). Each of the plurality of feature points may be a reference point extracted in order to acquire the contour of the face.

FIG. 5D shows a feature-point extraction process 573 indicating a state in which the plurality of feature points is extracted from the facial region 572. The learning data unit 130 acquires the contour of the facial region using the plurality of extracted feature points (S544). In one embodiment, the learning data unit 130 may acquire the contour of the facial region using Delaunay triangulation. Delaunay triangulation is technique of connecting feature points in a plane in a triangular shape and splitting a space such that a difference among three internal angles of the triangle is small. The learning data unit 130 may split the facial region 572 into a plurality of triangular regions using Delaunay triangulation, thereby acquiring the contour 574 of the face.

The learning data unit 130 three-dimensionally converts the contour of the acquired facial region (S545). The learning data unit 130 may three-dimensionally convert the contour 574 of the facial region split into the plurality of triangular regions. Therefore, as shown in FIG. 5D, a three-dimensional contour 575 can be obtained.

The learning data unit 130 adjusts the brightness of the contour of the three-dimensionally converted facial region according to a degrees of importance of the facial feature (S546). The learning data unit 130 may adjust the brightness of the contour according to the degree of importance of the facial element. For example, the learning data unit 130 may adjust the important facial elements such as eyes, nose and mouth to be darker than the other facial elements. Therefore, the three-dimensional contour 575, in which the brightness of the facial element is adjusted, can be obtained.

The learning data unit 130 converts the three-dimensionally converted contour having the adjusted brightness into a two-dimensional facial region based on the plurality of feature points (S547). The learning data unit 130 adjusts the converted two-dimensional facial region to a frontward form (S548). The learning data unit 130 may adjust the two-dimensional facial region to a frontward form in order to more accurately acquire the face of the person. That is, if the face is turned to another side in the two-dimensional facial region, the face of the person cannot be accurately acquired.

The learning data unit 130 acquires the final face according to the result of adjustment (S549). That is, as shown in FIG. 5D, the frontward final face can be acquired from the picture 570.

The learning data unit 130 determines whether the acquired final face is present in a predetermined number or more of pictures stored in the memory 170 (S550). In one embodiment, the learning data unit 130 may determine that a predetermined number or more of acquired final faces is present during a predetermined period. The predetermined period may be a week, which is merely exemplary.

If the acquired final face is present in a predetermined number or more of stored pictures, the learning data unit 130 selects the person including the final face as an object to be used as the editing criterion of the video (S551). In one embodiment, if a plurality of final faces is present in the predetermined number or more of pictures, the learning data unit 130 may select any one of the final faces as an object to be used as the editing criterion of the video according to priority. In one embodiment, priority may be determined according to the storage times of the pictures. If a plurality of final faces is present in the predetermined number or more of pictures, the learning data unit 130 may select the person of the final face included in a most recently stored picture as an object to be used as the editing criterion of the video.

In another embodiment, as priority, a face of a person most frequently appearing in the pictures may be selected as an object to be used as the editing criterion of the video. The learning data unit 130 may repeat the operations of blocks S541 to S551 with respect to the pictures stored in the memory 170 to learn the process of acquiring the final face.

FIGS. 6A(1), 6A(2), 6A(3), 6B(1), 6B(2), 6B(3) are diagrams illustrating a process of sensing an insignificant playback section from an entire playback section of video according to an embodiment of the present invention. These figures show an example in which the learning data unit 130 senses the insignificant playback section while playing back the video on the display unit 151 of the mobile terminal 100, without being limited thereto. That is, the learning data unit 130 may analyze image frames of the video stored in the memory 170 and sense the insignificant playback section, without displaying the video on the display unit 151. As another example, the learning data unit 130 may analyze the image frames of video received from the external server and sense the insignificant playback section.

The learning data unit 130 may set the face of a specific person as a criterion for distinguishing the insignificant image frames of the video, if the number of pictures including the face of the specific person among the pictures stored in the memory 170 is equal to or greater than a predetermined value. The display unit 151 displays a first image frame 611 of the video. The first image frame 611 may include the face 601 of a specific person. The learning data unit 130 may perform image analysis with respect to the stored pictures through the gallery application. The learning data unit 130 may extract a second image frame 613, which does not include the face 601 of the specific person, from among a plurality of image frames of the video.

The learning data unit 130 may acquire consecutive image frames as insignificant playback sections, if the image frames which do not include the face 601 of the specific person are consecutive. Thereafter, the learning data unit 130 may extract a third image frame 615 including the face 601 of the specific person. The learning data unit 130 may acquire consecutive image frames as significant playback sections, if the image frames including the face 601 of the specific person are consecutive.

FIGS. 6B(1), 6B(2), 6B(3) illustrate a process of, at the learning data unit 130, sensing a playback section, in which anything nothing is captured, among the entire playback section of the video. In particular, these figures show examples in which the learning data unit 130 senses the insignificant playback section without using information stored in the memory 170.

Referring to FIG. 6B(1), the display unit 151 may display a fourth image frame 631 and then display a fifth image frame 633 (FIG. 6B(2)). The fourth image frame 631 may include one or more objects and the fifth image frame 633 may not include an object. In particular, the fourth image frame 631 may be a black image frame which does not include an object. The learning data unit 130 may recognize the fourth image frame 631 as an insignificant image frame. The learning data unit 130 may sense consecutive image frames as an insignificant playback section, if the insignificant image frames are consecutive.

Thereafter, the learning data unit 130 may extract a sixth image frame 635 including one or more objects. The learning data unit 130 may sense consecutive image frames as a significant playback section, if the image frames including one or more objects are consecutive. Next, an embodiment of identifying an insignificant playback section of video upon playing back the video will be described.

Figure 8:
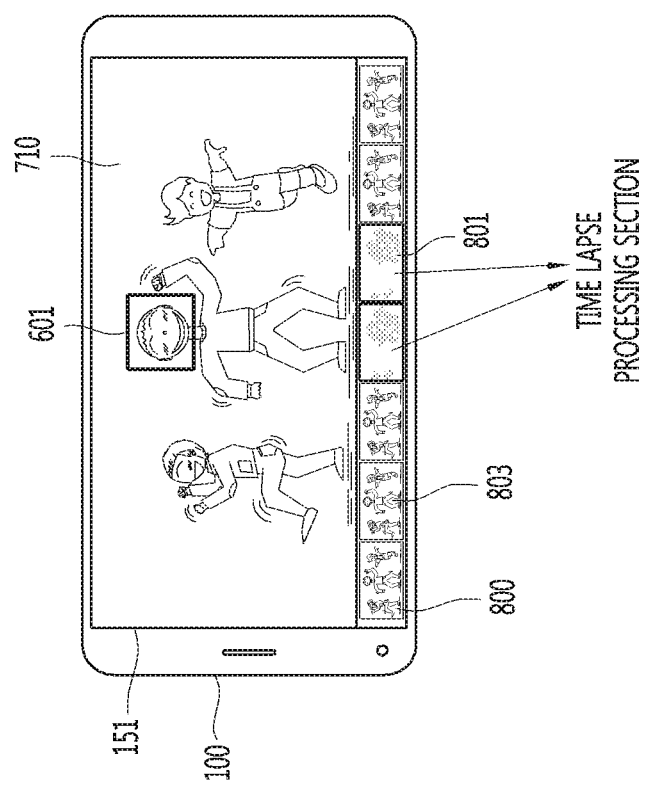

FIGS. 7 and 8 are diagrams illustrating an example of identifying an insignificant playback section while playing back video according to an embodiment of the present invention. In particular, FIG. 7 is a diagram illustrating an example of identifying an insignificant playback section of video on a progress bar 700 and FIG. 8 is a diagram illustrating an example of identifying an insignificant playback section on a thumbnail search bar 800.

Referring to FIG. 7, the display unit 151 of the mobile terminal 100 plays back video 710. The controller 180 may further display a progress bar 700 indicating the progress of the video 710. The insignificant playback sections 701 and 703 of the entire playback section of video are displayed on the progress bar 700. In addition, the progress bar 700 may include the significant playback sections 711, 713 and 715 except for the insignificant playback sections 701 and 703. The insignificant playback sections 701 and 703 and the significant playback sections 711, 713 and 715 may be displayed to be distinguished from each other. For example, the insignificant playback sections 701 and 703 and the significant playback sections 711, 713 and 715 may be displayed as different colors. Therefore, the user may easily check the insignificant playback sections.

Referring to FIG. 8, the controller 180 may display video 710 and a thumbnail search bar 800 on the display unit 151. The thumbnail search bar 800 may be used to search for or select a specific playback time of the video. The thumbnail search bar 800 may include a plurality of thumbnail images included in an insignificant playback section and a plurality of thumbnail images included in a significant playback section. A thumbnail image 801 included in the insignificant playback section and a second thumbnail image 803 included in the significant playback section may be displayed to be distinguished from each other. For example, the first thumbnail image 801 may be highlighted. Therefore, the user may easily check the thumbnail image included in the insignificant playback section. Next, an embodiment of editing an insignificant playback section of video will be described.

FIGS. 9A-9B, 10A-10C are diagrams illustrating an example of editing an insignificant playback section of video according to an embodiment of the present invention. In these figures, assume the learning data unit 130 senses a playback section of video, which does not include the face 601 of a specific person, as an insignificant playback section. Referring to FIG. 9A, the controller 180 may display the progress bar 700 while playing back the video 901. On the progress bar 700, the insignificant playback sections 701 and 703 and the other significant playback sections 711, 713 and 715 may be distinguishably displayed. If the insignificant playback section 703 is selected for a predetermined time, the controller 180 may display an editing menu 900 for editing the insignificant playback section 703. If the insignificant playback section 703 is selected for less than the predetermined time, the controller 180 may play back the selected insignificant playback section 703.

The editing menu 900 may be displayed adjacent to the insignificant playback section 703. The editing menu 900 may include a crop item 910 and an effect item 930. The crop item 910 may be an item for cropping the insignificant playback section 703 from the entire playback section of the video. That is, the controller 180 may delete the insignificant playback section 703, if the crop item 910 is selected. Thus, edited final video may be generated.

In another embodiment, if the insignificant playback section 703 is selected for the predetermined time or more, the controller 180 may delete the insignificant playback section 703. The effect item 930 may be an item for replacing the insignificant playback section 703 of the entire playback section of the video by another picture or video.

Referring to FIG. 9B, on the thumbnail search bar 800, a first thumbnail image 801 included in the insignificant playback section and a second thumbnail image 803 included in the significant playback section may be distinguishably displayed. If the first thumbnail image 801 is selected for a predetermined time or more, the controller 180 may display the editing menu 900 including the crop item 910 and the effect item 930, as described with reference to FIG. 9A. If the first thumbnail image 801 is selected for less than the predetermined time, the controller 180 may play back the video from the playback time corresponding to the selected first thumbnail image 801. The editing menu 900 may be displayed adjacent to the first thumbnail image 801.

Hereinafter, an example of editing an insignificant playback section will be described with regard to the embodiment of FIG. 9B. In FIG. 9B, if the crop item 910 is selected, the controller 180 may delete the first thumbnail image 801.

The first thumbnail image 801 may indicate the insignificant playback section 701 shown in FIG. 9a. If the first thumbnail image 801 is selected and the crop item 910 is selected, the controller 180 may delete the insignificant playback section 701. In another embodiment, if the first thumbnail image 801 is selected for the predetermined time or more, the controller 180 may delete the first thumbnail image 801. The user may easily delete the uninterested playback section of the video, thereby viewing only a desired portion.

Figure 10B:
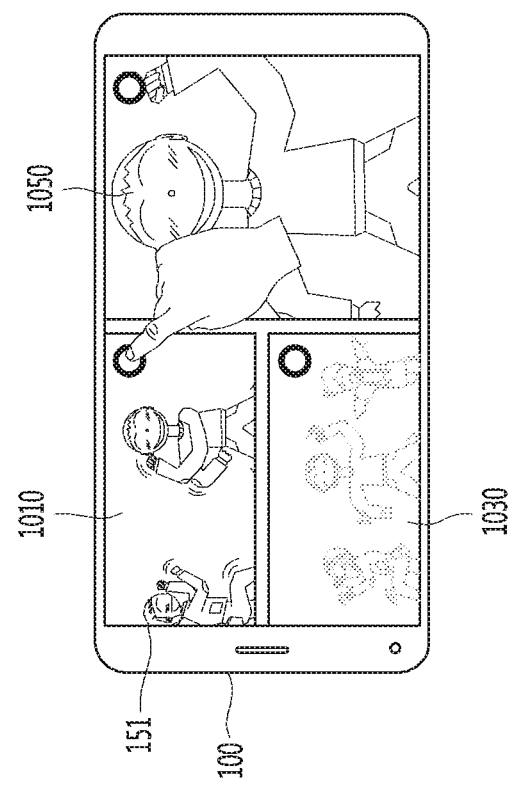
Figure 10C:
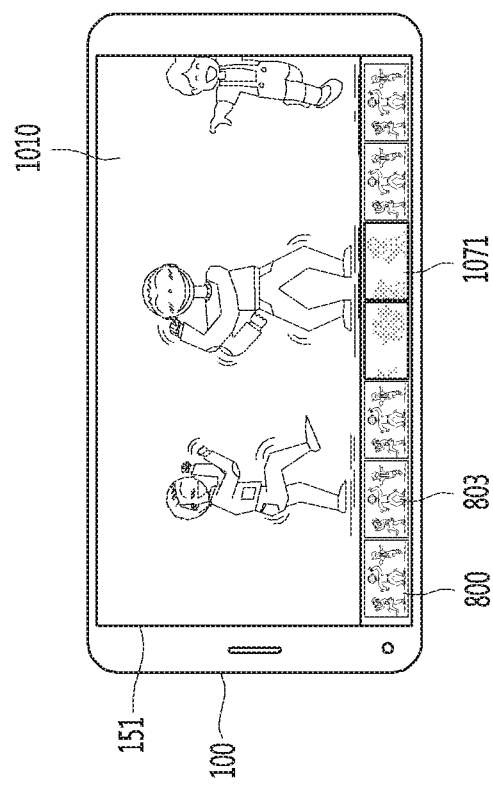

Meanwhile, in FIGS. 10A-10C, if the effect item 910 is selected, the controller 180 may display a plurality of pictures 1010, 1030 and 1050 including the face 601 of a specific person. In one embodiment, each of the plurality of pictures 1010, 1030 and 1050 may include the face 601 (see FIG. 9A) of the specific person among the pictures stored in the memory 170 in cooperation with the gallery application. In another embodiment, the plurality of pictures 1010, 1030 and 1050 may be image frames included in any one of the significant playback sections 711, 713 and 715 of the video 910. Although the example in which the plurality of pictures 1010, 1030 and 1050 is displayed if the effect item 910 is selected is described with reference to FIGS. 10A-10C, the present invention is not limited thereto. That is, if the effect item 910 is selected, the controller 180 may display the plurality of moving pictures including the face 601 of the specific person.

The moving picture is a graphic interchange format (GIF) picture obtained by capturing a moving scene for a short time. In another embodiment, if the effect item 910 is selected, the controller 180 may display some or all of the significant playback sections 711, 713 and 715. The user may replace the insignificant playback section by a desired picture or video. Meanwhile, according to another embodiment of the present invention, the controller 180 may provide various effects to the significant playback sections 711, 713 and 715. The controller 180 may decrease the playback speed of the significant playback section while playing back the video. For example, the controller 180 may decrease the playback speed and play back the significant playback section in slow motion.

As another example, the controller 180 may automatically enlarge and play back the significant playback section. In addition, according to another embodiment of the present invention, the mobile terminal 100 may adjust the playback speed of the video according to voice recognition or face recognition of the user who views the video.

FIGS. 11, 12, 13A-13C are diagrams illustrating an example of adjusting a playback speed of a specific section of video according to recognition of the voice or face of a user who views the video according to an embodiment of the present invention.

Figure 11:
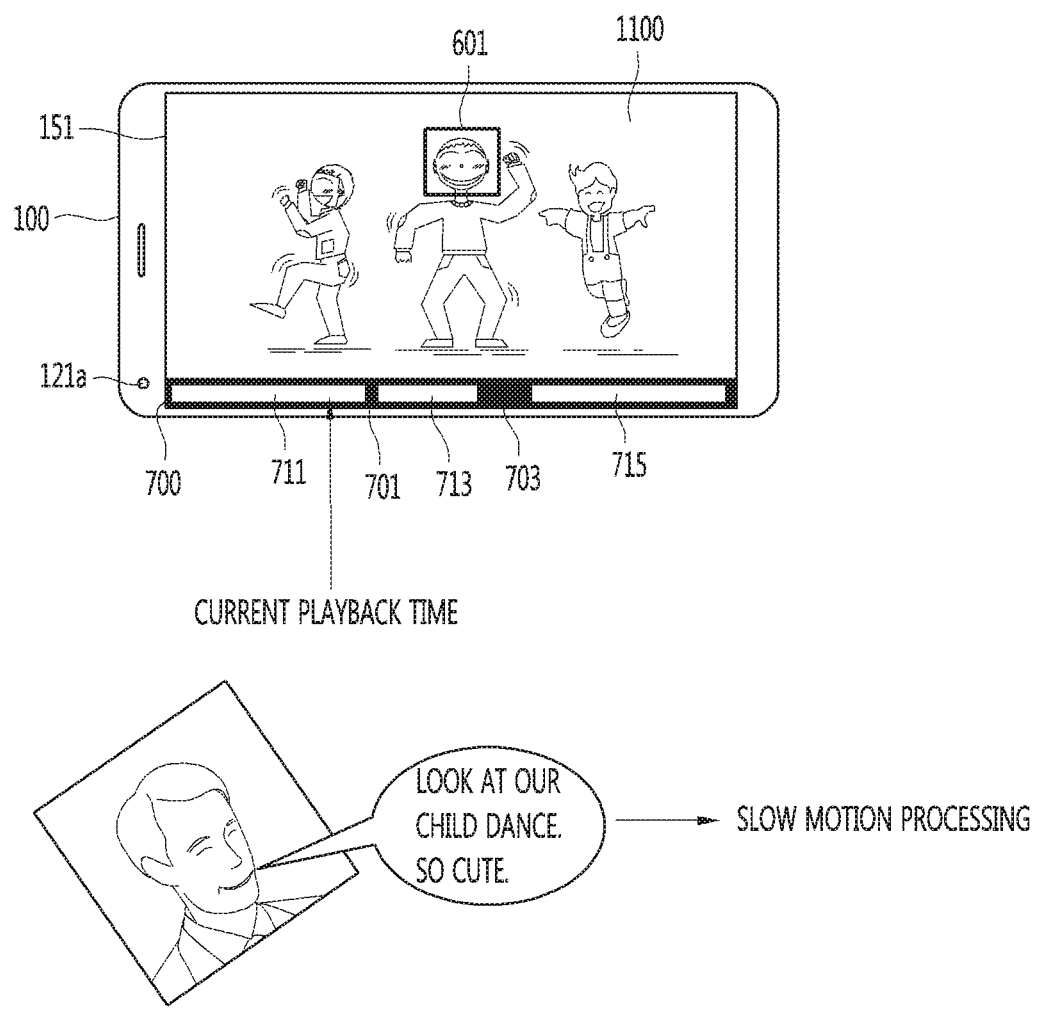
FIGS. 11, 12, 13A-13C are diagrams illustrating an example of adjusting a playback speed of a specific section of video according to recognition of the voice or face of a user who views the video according to an embodiment of the present invention.

Referring to FIG. 11, the display unit 151 plays back the significant playback section 711 of the video 1100. The learning data unit 130 may receive the voice of the user through the microphone 122 while playing back the significant playback section 711 of the video 1100. The learning data unit 130 may analyze the received voice of the user to check the emotional state of the user. The learning data unit 130 may decrease the playback speed of the significant playback section 711, upon determining that the emotional state of the user is positive. The positive emotional state may mean that the user feels good. If voice indicating the positive emotional state is received, the learning data unit 130 may compare the received voice with the voice stored in the memory 170 and determine that the emotional state of the user is positive. For example, if <Look at our child dance. So cute> is recognized, the learning data unit 130 may determine that the emotional state of the user is positive and decrease the playback speed of the significant playback section 711. The controller 180 may play back the significant playback section 711 in slow motion.

In another embodiment, the learning data unit 130 may analyze the acquired facial image of the user through the first camera 121a and determine the emotional state of the user. While the significant playback section 711 of the video 100 is played back, the learning data unit 130 analyzes the facial image of the user acquired through the first camera 121*a*. The learning data unit 130 may determine that the emotional state of the user is positive, if the facial image of the user matches a facial image indicating the positive state, which is stored in the memory 170. The learning data unit 130 may decrease the playback speed of the significant playback section 711, upon determining that the emotional state of the user is positive.

Figure 12:
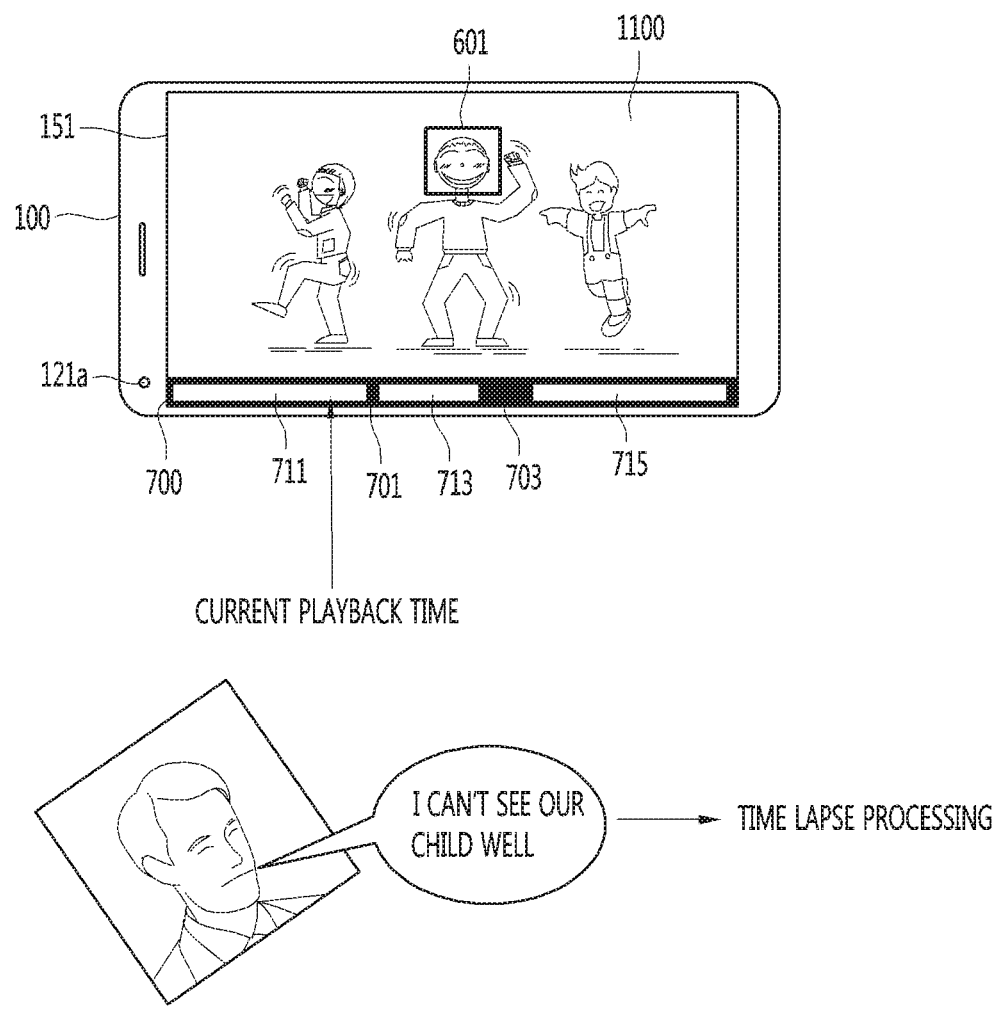

Now referring to FIG. 12, the display unit 151 may play back the significant playback section 711 of the video 1100. The learning data unit 130 may receive the voice of the user through the microphone 122 while playing back the significant playback section 711 of the video 1100. The learning data unit 130 may analyze the voice of the user to identify the emotional state of the user. The learning data unit 130 may decrease the playback speed of the significant playback section 711, upon determining that the emotional state of the user is negative. The negative state may indicate that the user feels bad.

If voice indicating the negative state is received, the learning data unit 130 compares the received voice with voice indicating a negative state and determine that the emotional state is negative. For example, the learning data unit 130 may determine that the emotional state of the user is negative and increase the playback speed of the significant playback section 711, if <I can't see our child well> is recognized. The controller 180 may perform time lapse processing with respect to the significant playback section 711 to enable rapid playback.

In another embodiment, the learning data unit 130 may analyze the facial image of the user acquired through the first camera 121*a* and determine the emotional state of the user. The learning data unit 130 may analyze the facial image of the user acquired through the first camera 121 while playing back the significant playback section 711 of the video 1100. The learning data unit 130 may determine that the emotional state of the user is negative, if the facial image of the user matches a facial image indicating the negative state, which is stored in the memory 170. The learning data unit 130 may increase the playback speed of the significant playback section 711, upon determining that the emotional state of the user is negative.

Figure 13A:
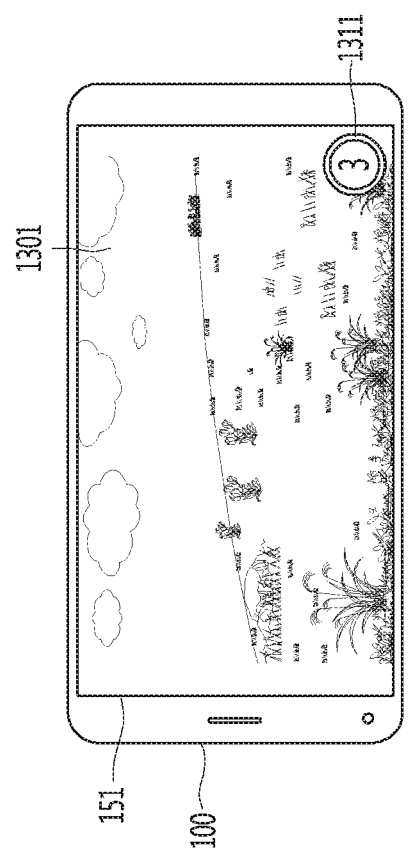
Figure 13B:
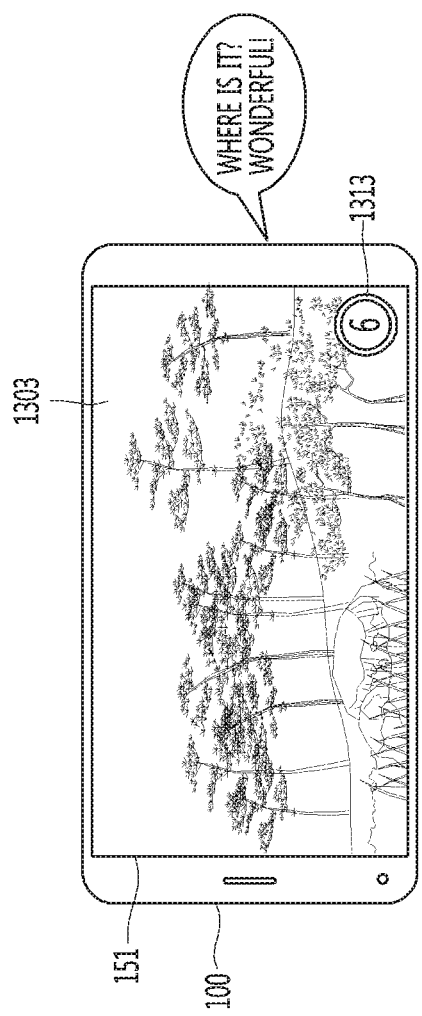
Figure 13C:
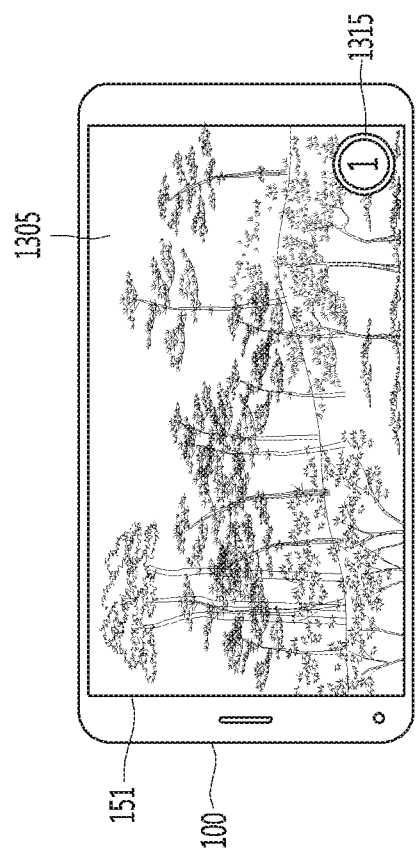

FIGS. 13A-13C are diagrams illustrating an example of adjusting a playback speed of a specific section of video according to recognition of the voice or face of a user who views the video according to an embodiment of the present invention.

In FIG. 13A, the display unit 151 displays a first picture 1301. The display unit 151 may further include a first time indicator 1331 indicating a time that a first picture 1301 is displayed. The first time indicator 1311 may indicate that the first picture 1301 may be displayed for three seconds. Three seconds are merely exemplary and a default time may be set. That is, each picture of the picture slideshow may be played back for three seconds.

The controller 180 may continue to display the first picture 1301 if the first time indicator 1311 is selected. Thereafter, the display unit 151 may change the first picture 1301 to a second picture 1303 (FIG. 13B). The learning data unit 130 may recognize voice indicating the positive state of the user through the microphone 1220 while playing back the second picture 1303. For example, if voice <Where is it? Wonderful!> indicating the positive state is recognized, the learning data unit 130 may increase the time if the second picture 1303 is displayed. Therefore, the first time indicator 1311 indicating a playback time of three seconds may be changed to a second indicator 1313 indicating a playback time of 6 seconds. In addition, the display unit 151 may change the second picture 1303 to a third picture 1305 (FIG. 13C).

The learning data unit 130 may decrease the playback time of the third picture 1303 based on the voice received through the microphone 122 and similarity between the third picture 1305 and the second picture 1303 which is a previous picture, while playing back the third picture 1305. For example, the learning data unit 130 may decrease the playback time of the third picture 1305, if the voice input through the microphone 122 is not received for a predetermined time while playing back the third picture 1305 and the similarity between the third picture and the second picture 1303 is equal to or greater than a predetermined value. Therefore, the second time indicator 1313 indicating the playback time of 6 seconds may be changed to a third indicator 1315 indicating a playback time of 1 second. Next, an example of automatically setting a total playback time of video to a time desired by a user according to an embodiment of the present invention will be described.

Figure 14A:
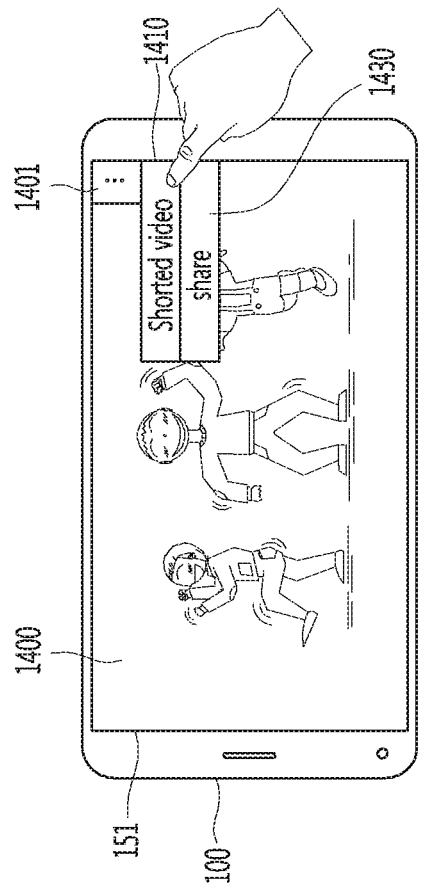
FIGS. 14A-14C are diagrams illustrating a process of automatically editing a total playback time of video to a time desired by a user according to an embodiment of the present invention.
Figure 14B:
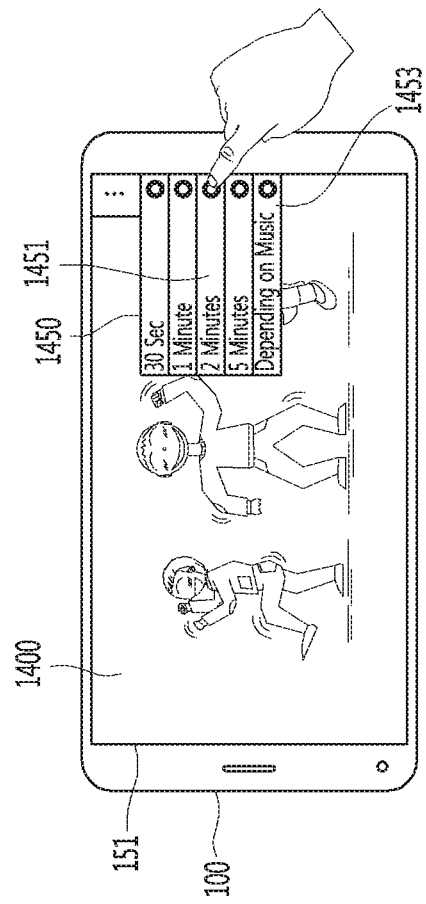
Figure 14C:
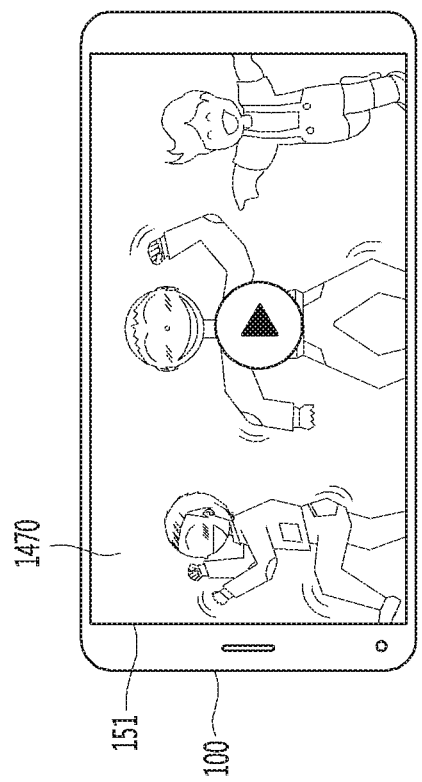

FIGS. 14A-14C are diagrams illustrating a process of automatically editing a total playback time of video to a time desired by a user according to an embodiment of the present invention. Referring to FIG. 14A, the display unit 151 displays video 1400 to be edited. The display unit 151 may further display a video editing menu 1401.

In FIG. 14A, a total playback time of video is 30 minutes. If the video editing menu 1401 is selected, the controller 180 may display a playback time editing item 1410 and a sharing item 1430. The playback time editing item 1410 may be used to decrease the total playback time of the video 1410. The sharing item 1430 may be used to share the video 1430 with another person. If a command 1410 for selecting the playback time editing item 1410 is received, the controller 180 may display an editing time list 1450 including a plurality of editing times. The editing time list 1450 may include a plurality of editing times for decreasing the total playback time of the video 1400 to a specific time.

The learning data unit 130 may edit 30 minute video 1400 and automatically generate a 2 minute video 1470, if a "2 minutes" item 1451 is selected from the editing time list 1450. The learning data unit 130 may also sense an insignificant playback section of the entire playback section of the video 1400. The insignificant playback section was described with respect to FIGS. 5A-5C. The learning data unit 130 may delete the insignificant playback section of the entire playback section of the video 1400. The learning data unit 130 may increase the playback speed of the significant playback section, if video having the 2 minute playback time cannot be obtained even if the insignificant playback section of the entire playback section of the video 1400 is deleted. The learning data unit 130 may perform time lapse processing with respect to any one of the plurality of significant playback sections. In one embodiment, any one section may be a longest playback section of the plurality of significant playback sections. The video 1470 edited to have a 2 minute playback section may be provided through a preview function. The user may store the edited video 1470 after viewing the edited video 1470 as a preview function.

Meanwhile, the editing time list 1450 may further include a "depending on music" item 1453. The "depending on music" item 1453 may be used to decrease the total playback time of the unedited video 1400 to a total playback time of music, if music is added to the edited video 1470 to be played back. The learning data unit 130 may display music files and decrease the playback time of the video 1400 to a total playback time of a music file selected from among the music files, if the "depending on music" item 1453 is selected. Therefore, the unedited video may be edited to have a playback length of the music file.

FIGS. 15A(1), 15A(2), 15B(1), 15B(2) are diagrams illustrating examples of automatically editing video according to a sharing unit upon sharing video according to an embodiment of the present invention. Discussion of these figures will also make reference to the embodiments of FIGS. 14A-14C.

In particular, FIGS. 15A(1), 15A(2) provide examples of sharing edited video through an application A, and FIGS. 15B(1), 15B(2) illustrate examples of sharing edited video through an application B.

Referring specifically now to FIGS. 15A(1), 15A(2), if the sharing item 1430 is selected, the controller 180 may display an application list for sharing the video 1400. The learning data unit 130 may acquire a transmission capacity which may be provided by the application A, if the application A is selected from among a plurality of applications included in the application list. The learning data unit 130 may automatically adjust one or more of the resolution or total playback time of the video 1400 based on the transmission capacity which may be provided by the selected application. For example, assume that the capacity of the video 1400 is 100 Mb, the video has high quality and the transmission capacity which may be provided by the application A is 20 Mb.

The learning data unit 130 may change the image quality of the video 1400 from high image quality to middle image quality according to transmission capacity limit, if the capacity of the video 1400 is greater than the transmission capacity which may be provided by the application A. The learning data unit 130 may display a change progress window 1510 indicating that the image quality of the video 1400 is being changed from high image quality to middle image quality. The controller 180 may transmit the video with middle image quality to a terminal of another person through the application A, if the entire playback section of the video 1400 is converted from high image quality to middle image quality. Therefore, the user may not fail to transmit the video due to the transmission capacity limit of the application, upon sharing the video.

According to another embodiment of the present invention, the learning data unit 130 may change the image quality of the insignificant playback section of the entire playback section of the video 1400 from high image quality to middle image quality. That is, the learning data unit 130 may change only the image quality of the insignificant playback section to middle image quality and maintain the other playback section with high image quality, if the capacity of the video in which the image quality of the insignificant playback section is changed to middle image quality that is less than the transmission capacity which may be provided by the application A. Therefore, the user may share the video with another person while maintaining the image quality of the original video to its maximum.

Referring now to FIGS. 15B(1), 15B(2), the controller 180 may display an application list for sharing the video 1400, if the sharing item 1430 is selected. The learning data unit 130 may acquire a transmission capacity which may be provided by the application B, if the application B is selected from among a plurality of applications included in the application list. The learning data unit 130 may automatically adjust one or more of the resolution or total playback time of the video 1400 based on the transmission capacity which may be provided by the selected application. For example, assume that the capacity of the video 1400 is 100 Mb, the video has high quality and the transmission capacity which may be provided by the application B is 20 Mb.

The learning data unit 130 may decrease the resolution of the video 1400 according to a transmission capacity limit, because the capacity of the video 1400 is greater than the transmission capacity which may be provided by the application B. The learning data unit 130 may automatically delete the insignificant playback section from the entire playback section of the video having low image quality, if the capacity of the video with low image quality is greater than the transmission capacity which may be provided by the application B even if the resolution of the video 1400 is changed to low image quality. The learning data unit 130 may display a change progress window 1530 indicating that the image quality of the video 1400 is being changed from high image quality to low image quality and the insignificant playback section is being deleted. The controller 180 may transmit the video, the image quality of which is changed from high image quality to low image quality, and from which the insignificant playback section is deleted, to the terminal of another person through the application B. Therefore, the user may share the video with another person regardless of the transmission capacity limit of the application.

Again, embodiments discussed herein include reference to the learning data unit 130 performing certain operations. However, some or all of such operation may alternatively or additionally be implemented using a processor or controller, such as controller 180.

According to the embodiments of the present invention, sections, in which a user is not interested, included in video may be automatically skipped, such that the user views only desired portions with concentration. According to other embodiments of the present invention, the user does not need to search video for a desired portion, thereby increasing convenience.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A terminal comprising:
a memory;
a microphone configured to receive an audio data of a user;
a display; and
a controller configured to:
store, in the memory, use pattern information of a user;
select an object to be used as an importance criterion of a video based on the stored use pattern information;
identify in the video one or more first playback sections which include the object;
identify in the video one or more second playback sections which do not include the object;
categorize the one or more second playback sections as having less importance within the video;
receive the audio data of the user via the microphone during display of a particular section of the one or more first playback sections of the video, wherein a first time indicator indicating a first playback time of the particular section is displayed with the particular section;
compare the audio data with a voice data stored in the memory;
detect a positive or negative user response to the display of the particular section based on a result of the comparison;
change the first time indicator to a second time indicator indicating a second playback time of the particular section when a positive user response is detected, wherein the second playback time is greater than the first playback time; and
increase a playback time of the particular section from the first playback time to the second playback time.

2. The terminal according to claim 1, wherein the controller is further configured to:
select a specific person as the importance criterion when the face of the specific person appears in a number of pictures stored in the memory that is greater than or equal to a predetermined number.

3. The terminal according to claim 2, wherein the controller is further configured to:
select as the importance criterion a specific person that appears in a most recently stored picture among the pictures stored in the memory when a plurality of persons appear in a number of pictures that is greater than or equal to the predetermined number.

4. The terminal according to claim 2, wherein the controller is further configured to:
select as the importance criterion a person most frequently appearing in a group of pictures among the pictures stored in the memory when a plurality of persons appear in a number of pictures that is greater than or equal to the predetermined number.

5. The terminal according to claim 1, wherein the controller is further configured to:
cause the display to display one or more playback sections of the video at a predetermined speed or more, when a total playback time of the video is greater than a predetermined playback time after deleting the one or more second playback sections,
wherein the predetermined playback time is set according to a video playback request.

6. The terminal according to claim 5, wherein the controller is further configured to:
adjust a first playback speed of the one or more first playback sections to a second playback speed greater than the first playback speed.

7. The terminal according to claim 1, wherein the controller is further configured to:
cause the display to display the one or more first playback sections at less than a predetermined speed, when a total playback time of the video is less than a predetermined playback time after deleting the one or more second playback sections,
wherein the predetermined playback time is set according to a video playback request.

8. The terminal according to claim 7, wherein the controller is further configured to:
adjust a first playback speed of the one or more first playback sections to a second playback speed less than the first playback speed.

9. The terminal according to claim 1, wherein the controller is further configured to:
select a specific person as the importance criterion when a number of times of having telephone communications with the specific person is equal to or greater than a predetermined value.

10. A terminal comprising:
a display;
a microphone configured to receive an audio data of a user; and
a controller configured to:
display via the display a video comprising a plurality of sections;
receive the audio data of the user via the microphone during display of a particular section of the one or more first playback sections of the video, wherein a first time indicator indicating a first playback time of the particular section is displayed with the particular section;
compare the audio data with a voice data stored in a memory;
detect a positive or negative user response to the display of the particular section based on a result of the comparison;
change the first time indicator to a second time indicator indicating a second playback time of the particular section when the positive user response is detected, wherein the second playback time is greater than the first playback time; and
increase a playback time of the particular section from the first playback time to the second playback time.

* * * * *